United States Patent

Abhishek Raja et al.

(10) Patent No.: US 11,221,951 B1
(45) Date of Patent: Jan. 11, 2022

(54) SKIPPING TAG CHECK FOR TAG-CHECKED LOAD OPERATION

(71) Applicant: Arm Limited, Cambridge (GB)

(72) Inventors: Abhishek Raja, Austin, TX (US); Kias Magnus Bruce, Leander, TX (US); Albin Pierrick Tonnerre, Nice (FR)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 17/028,248

(22) Filed: Sep. 22, 2020

(51) Int. Cl.
*G06F 12/00* (2006.01)
*G06F 12/0802* (2016.01)
*G06F 3/06* (2006.01)

(52) U.S. Cl.
CPC ........ *G06F 12/0802* (2013.01); *G06F 3/0622* (2013.01); *G06F 3/0655* (2013.01); *G06F 3/0673* (2013.01); *G06F 2212/60* (2013.01)

(58) Field of Classification Search
CPC .. G06F 12/0802; G06F 3/0622; G06F 3/0655; G06F 3/0673; G06F 2212/60
See application file for complete search history.

(56) References Cited

PUBLICATIONS

Extract of Armv8.6 spec on Memory Tagging Extension, Arm Architecture Reference Manual, Armv8, for Armv8-A architecture profile, 2020, 13 pages.
"Arm v8.5-A Memory Tagging Extension" Arm Whitepaper, Oct. 9, 2019, pp. 1-9.

*Primary Examiner* — Gurtej Bansal
(74) *Attorney, Agent, or Firm* — Nixon & Vanderhye P.C.

(57) ABSTRACT

A tag check performed for a memory access operation comprises determining whether an address tag associated with a target address of the access corresponds to a guard tag stored in the memory system associated with a memory system location to be accessed. A given tag check architecturally required for a tag-checked load operation can be skipped when a number of tag-check-skip conditions are satisfied, including at least: that there is an older tag-checked store operation awaiting a pending tag check, for which a guard tag checked in the pending tag check is associated with a same block of one or more memory system locations as a guard tag to be checked in the given tag check; and that the address tag for the tag-checked load operation is the same as the address tag for the older tag-checked store operation.

18 Claims, 7 Drawing Sheets

SKIPPING TAG CHECK FOR TAG-CHECKED LOAD OPERATION

BACKGROUND

Technical Field

The present technique relates to the field of data processing.

Technical Background

Software to be executed by a data processing apparatus may typically be written in a high-level programming language and then compiled into code according to the instruction set architecture supported by the apparatus on which the software is to be executed. For example, the software may originally be written in a high level language such as Java, C or C++, and then compiled into a natively supported instruction set architecture such as x86 or Arm®.

Some high level programming languages, such as Java, are considered memory-safe languages because they include run time error detection checks for checking for certain errors relating to memory accesses. In contrast, memory-unsafe languages, such as C and C++, do not include such run time error checks. The enduring prevalence of use of memory-unsafe languages means that in compiled code according to a given instruction set architecture, there may be a large number of memory related errors which may be vulnerable to exploitation by an attacker or other malicious party. Such errors may include:

- Bounds violations, in which an array index supplied by the code is outside the legitimate bounds of the array;
- Use-after-free errors, in which an access to a memory location is made after that memory location has already been deallocated or freed;
- Use-after-return, in which a memory access to an address associated with a variable used within a function (such as a value on a stack) is made after already returning from the function;
- Use-out-of-scope errors, in which variables are accessed outside of the scope in which they are declared; and
- Use-before-initialisation errors, in which a memory address associated with a variable is accessed before the variable has been initialised.

These are just some examples of memory-related errors which can result in unpredictable behaviour and potentially provide avenues for attackers to exploit. Hence, it may be desirable to provide architectural support, within the instruction set architecture supported by a given processing apparatus, for assisting with runtime detection of certain classes of memory errors.

SUMMARY

At least some examples provide an apparatus comprising: memory access circuitry to perform memory access operations to access data stored in a memory system; tag checking circuitry to perform at least one tag check for a tag-checked memory access operation for accessing data stored at one or more addressed memory system locations identified based on a target address specified by the tag-checked memory access operation, where the target address is associated with an address tag, and each tag check comprises: determining whether the address tag corresponds to a guard tag stored in the memory system associated with at least a subset of the one or more addressed memory system locations, and performing an error reporting action when the tag check identifies that the address tag and the guard tag do not correspond; and tag-check-skip control circuitry to determine whether a plurality of tag-check-skip conditions are satisfied for a tag-checked load operation, the tag-check-skip conditions comprising at least: that there is an older tag-checked store operation awaiting a pending tag check, for which a guard tag checked in the pending tag check is associated with the same block of memory system locations as a guard tag to be checked in a given tag check architecturally required to be performed for the tag-checked load operation; and that the address tag for the tag-checked load operation is the same as the address tag for the older tag-checked store operation; wherein the tag-check-skip control circuitry is configured to control the tag checking circuitry to skip performing the given tag check for the tag-checked load operation when the plurality of tag-check-skip conditions are determined to be satisfied.

At least some examples provide an apparatus comprising: means for performing memory access operations to access data stored in a memory system; means for tag checking, to perform at least one tag check for a tag-checked memory access operation for accessing data stored at one or more addressed memory system locations identified based on a target address specified by the tag-checked memory access operation, where the target address is associated with an address tag, and each tag check comprises: determining whether the address tag corresponds to a guard tag stored in the memory system associated with at least a subset of the one or more addressed memory system locations, and performing an error reporting action when the tag check identifies that the address tag and the guard tag do not correspond; and means for determining whether a plurality of tag-check-skip conditions are satisfied for a tag-checked load operation, the tag-check-skip conditions comprising at least: that there is an older tag-checked store operation awaiting a pending tag check, for which a guard tag checked in the pending tag check is associated with a same block of one or more memory system locations as a guard tag to be checked in a given tag check architecturally required to be performed for the tag-checked load operation; and that the address tag for the tag-checked load operation is the same as the address tag for the older tag-checked store operation; wherein the means for determining is configured to control the means for tag checking to skip performing the given tag check for the tag-checked load operation when the plurality of tag-check-skip conditions are determined to be satisfied.

At least some examples provide a method comprising: performing memory access operations to access data stored in a memory, using an apparatus comprising tag checking circuitry to perform at least one tag check for a tag-checked memory access operation for accessing data stored at one or more addressed memory system locations identified based on a target address specified by the tag-checked memory access operation, where the target address is associated with an address tag, and each tag check comprises: determining whether the address tag corresponds to a guard tag stored in the memory system associated with at least a subset of the one or more addressed memory system locations, and performing an error reporting action when the tag check identifies that the address tag and the guard tag do not correspond; for a tag-checked load operation, determining whether a plurality of tag-check-skip conditions are satisfied for a tag-checked load operation, the tag-check-skip conditions comprising at least: that there is an older tag-checked store operation awaiting a pending tag check, for which a guard tag checked in the pending tag check is associated with a same block of one or more memory system locations as a guard tag to be checked in a given tag check architecturally required to be performed for the tag-checked load operation; and that the address tag for the tag-checked load operation is the same as the address tag for the older tag-checked store operation; and when the plurality of tag-check-skip conditions are determined to be satisfied, skipping performing the given tag check for the tag-checked load operation.

Further aspects, features and advantages of the present technique will be apparent from the following description of examples, which is to be read in conjunction with the accompanying drawings.

DESCRIPTION OF EXAMPLES

Figure 1:
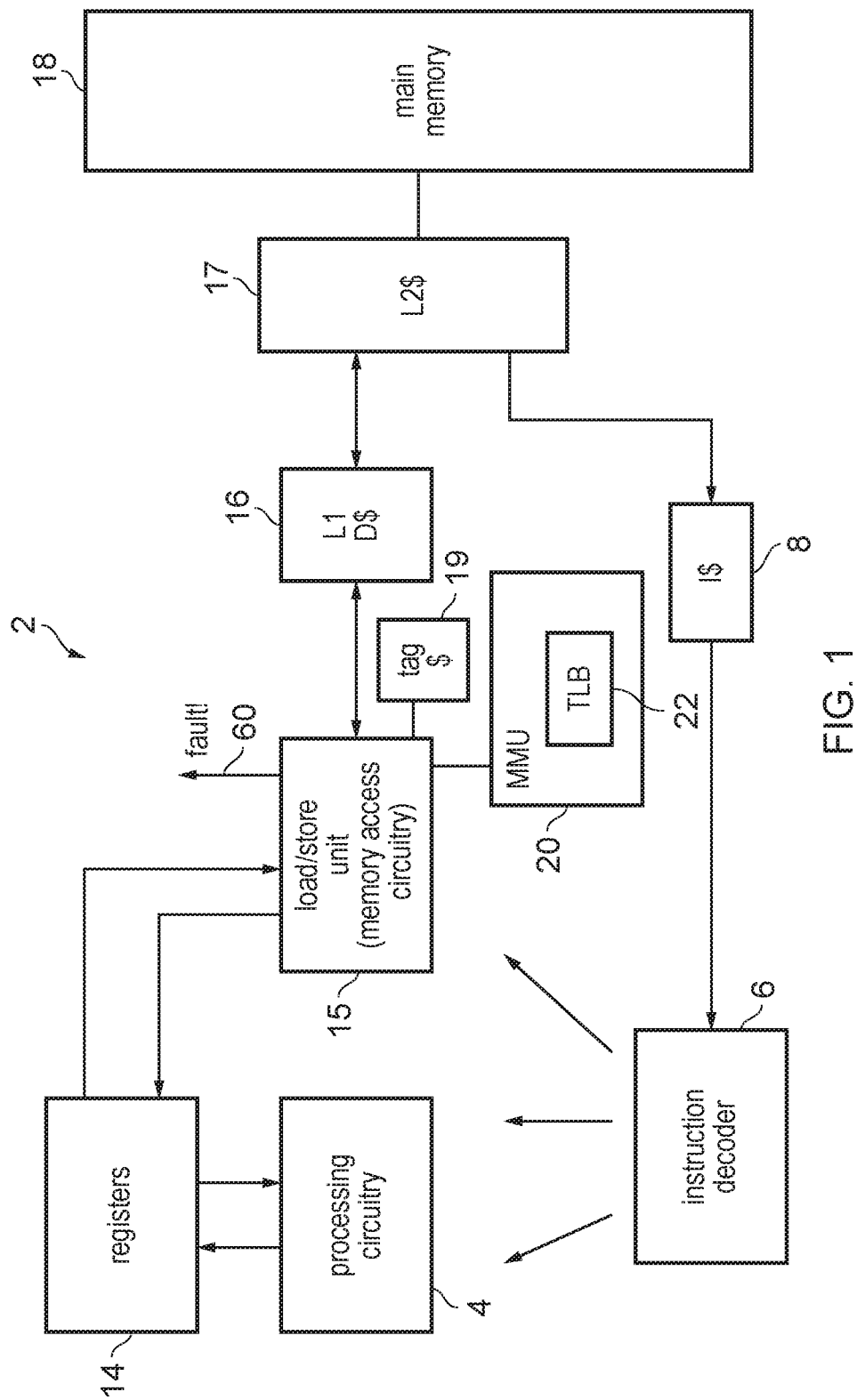
FIG. 1 schematically illustrates an example of a data processing apparatus.

One approach for protecting against certain memory usage errors of the types discussed above involves providing guard tags which are stored in a memory system in association with blocks of one or more memory system locations. Memory access circuitry may perform a memory access operation to access data stored in the memory system. Tag checking circuitry may perform at least one tag check for a tag-checked memory access operation for accessing data stored at one or more address memory system locations identified based on a target address specified by the tag-checked memory access operation. The target address is associated with an address tag. Each tag check comprises: determining whether the address tag associated with the target address corresponds to a guard tag stored in the memory system associated with at least a subset of the one or more addressed memory system locations, and performing an error reporting action when the tag check identifies that the address tag and the guard tag do not correspond.

This can be useful as, for example, a compiler compiling code based on a memory-unsafe language such as C or C++ can, when initialising regions of memory, set the guard tags to particular values for blocks of memory which code is expected to access, and may associate corresponding address tag values with the target addresses pointing to those blocks. If a memory usage error occurs, and for example the address pointer is used out of scope or extends out of the bounds of the valid range which was initialised, then it may be likely that the guard tag associated with the addressed location may not correspond to the address tag associated with the target address, and then in this case the error can be reported. Hence, even if the high level language in which the code is written does not have means for performing run time error checks to guard against memory access errors, the ISA used for the compiled code may include architectural features for performing such tag checks.

Although such memory tagging can provide a convenient way for hardware to be able to identify and report security bugs that may arise in software being executed, the tag checking may incur some additional overhead in terms of performance. Performing a tag check may require the guard tag for the addressed memory system location to be read from the memory system, and although caching of read guard tags can be used to reduce the delay, this may still incur some additional delay compared to a non-tag-checked memory access operation. There may also be restrictions on the timing at which guard tag reads for respective memory access operations can occur, to take account of any architectural memory ordering requirements which may be imposed by the instruction set architecture to ensure consistency of results. Such architectural ordering requirements may cause the tag check to be delayed for a younger memory access operation while awaiting a pending tag check for an older tag-checked memory access operation, which can reduce performance.

One scenario which may encounter such delays may be where a tag-checked load operation requires a given tag check to be performed using a particular guard tag associated with a given block of memory system locations, when there is still an older tag-checked store operation awaiting a pending tag check which uses a guard tag associated with the same block of one or more memory system locations as the guard tag to be checked in the given tag check for the younger tag-checked load operation. In this scenario, one might expect that the tag-checked load should defer its tag check until the pending tag check has been performed for the older tag-checked store operation, to ensure correct results even if the guard tag involved in the tag check has been updated part way through the program execution.

However, the inventors recognised that there are certain scenarios in which it is not necessary to defer the tag check for the load while waiting for the pending tag check for the store, and in fact in some scenarios it is possible to skip performing the given tag check for the tag-checked load operation altogether when certain tag-check-skip conditions are determined to be satisfied. This can avoid the tag-checked load operation being delayed unnecessarily due to the pending tag check on the older tag-check store operation, and hence this may allow earlier processing not only of the tag-checked load operation itself, but also for subsequent operations which depend on the tag-checked load operation. This can improve performance.

Hence, the apparatus may have tag-check-skip control circuitry to determine whether a number of tag-check-skip conditions are satisfied for a tag-checked load operation. The tag-check-skip conditions include at least: that there is an older tag-checked store operation awaiting a pending tag check, for which a guard tag checked in the pending tag check is associated with a same block of one or more memory system locations as a guard tag to be checked in a given tag check architecturally required to be performed for the tag-checked load operation; and that the address tag for the tag-checked load operation is the same as the address tag for the older tag-checked store operation. When the tag-check-skip conditions are determined to be satisfied the tag-check-skip control circuitry may control the tag checking circuitry to skip performing the given tag check for the tag-check load operation. This recognises that when the address tag is the same for both the older tag-checked store operation and the tag-checked load operation, and both the pending tag check for the older tag-checked store and the given tag check for the tag-checked load use the same guard tag associated with the same block of one or more memory system locations, then even if the value of that guard tag was changed between completion of the store and completion of the load, the outcome can still be consistent with architecturally correct processing results and so it is not necessary to perform the given tag check for the tag-checked load operation, as the responsibility for performing that tag check can effectively be delegated to the older tag-checked store which is already performing a check using the same address tag value and a guard tag associated with the same block of one or more memory system locations that will be accessed in the load. By skipping the given tag check when possible then this improves performance.

The load data required by a particular tag-checked load operation could span across memory system locations which are associated with more than one guard tag (if the address locations cross a tag granule boundary at which the guard tag values change from one block of one or more memory system locations to another). Hence, it will be appreciated that the determination of whether the tag-check-skip conditions are satisfied for a given tag check architecturally required for the tag-checked load operation may be repeated for each tag check required to be performed for the tag-checked load operation, in cases where the load requires more than one different tag check using guard tags for different blocks of memory system locations. Also, it will be appreciated that in some cases there may be more than one older tag-checked store operation pending when the tag-checked load operation is received and it is possible that the addressed locations targeted by the load could overlap with the address locations targeted by more than one older store, so in that case the evaluation of the tag-check-skip conditions could involve comparisons with respect to more than one older tag-checked store operation. On other occasions, there may only be a single earlier store pending which involves a tag check associated with a guard tag for a memory system location that overlaps with the locations targeted by the tag-checked load operation.

In summary, while the tag-checked load operation may architecturally be required to perform a given tag check, the skipping of the tag check may still be permitted when certain tag-check-skip conditions are satisfied. This is because when the load is preceded by an older tag-checked store operation and the tag-check-skip conditions are satisfied then the results of processing the older tag-checked store operation and the subsequent tag-checked load operation with the given tag check skipped may be architecturally equivalent to those which would have arisen if the given tag check had actually been performed for the tag-checked load operation. Therefore, skipping of the given tag check may still be permitted from an architectural point of view as long as the results of processing are consistent with those that would have arisen if the tag check had been performed.

The tag checking circuitry may be configured to ensure that, at least when the one or more addressed memory system locations to be accessed in response to the tag-checked load operation overlap with the one or more addressed memory system locations to be accessed in response to the older tag-checked store operation, results of processing the tag-checked load operation and the older tag-checked store operation are consistent with results which would be obtained if any store-operation guard tag read operations for the older tag-checked store operation are completed before performing any load-operation guard tag read operations for the tag-checked load operation. Here, the store-operation guard tag read operations refer to operations to read any one or more guard tags from the memory system for use in any tag checks architecturally required for the older tag-checked store operation, and the load-operation guard tag read operations refer to operations to read any guard tags for use in any tag checks architecturally required for the tag-checked load operation.

Hence, from an architectural point of view, at least when the load and the earlier store are targeting overlapping addresses, the tag checking circuitry may be required to enforce an ordering requirement so that the results of processing any memory access operations are consistent with those results which would have been obtained if the tag check for the load (and any read operations to read any tags required for that load) were deferred until after any guard tag read for the older store has been performed. However, this does not necessarily mean that the load-operation guard tag read operations actually have to be deferred until after the store-operation guard tag read operations, as long as the outcome is consistent with the outcome that would have arisen if they had been deferred until after the store-operation guard tag read operations.

Note that this ordering requirement applies to an older tag-checked store operation and a younger tag-checked load operation at least in the case where they both require access to the same addressed location (as there is an overlap in the address ranges targeted by the store/load operations). Hence, if the younger tag-checked load operation and the older tag-checked store operation target separate non-overlapping addresses, then there is no need to enforce this ordering requirement.

In other implementations of an architecture, the ordering requirement may be tighter and may require more generally that, in the case where both the earlier store and load operation require a tag check to be performed using a guard tag for the same block of memory system locations, the ordering requirement should be applied, even if the store and load target non-overlapping address ranges within the same block. However, this is not essential.

The ordering requirement can be useful because it is possible that the value of the guard tag to be checked in the respective tag checks for the older tag-checked store operation and the younger tag-checked load operation could be updated part-way through processing, so if the load-operation guard tag read operations were allowed to bypass the store-operation guard tag read operations then it is possible that a younger instruction could be processed using an older value of the guard tag prior to the update while an older instruction in program order could be processed using a newer value following the update, which would be a violation of memory consistency. Given this ordering requirement, one would expect it would be necessary to perform the tag check for the load separately from the tag check for the store. However, the inventors have, counter-intuitively, recognised that there are certain conditions in which it is still possible to skip the given tag check for the tag-checked load operation while still complying with the architectural ordering requirements, so that performance can be improved by providing the tag-check-skip control circuitry.

In cases where the tag-check-skip conditions are determined to be satisfied for the tag-checked load operation, the tag-check-skip control circuitry can control the memory access circuitry to allow the tag-checked load operation to proceed without waiting for a result of the pending tag check for the older tag-checked store operation. This can be possible even in modes of operation where normally a tag-checked memory access operation cannot be committed until its corresponding tag check is complete. This is because the load has delegated its tag check responsibility to the store, and so any error reporting actions which would have been triggered by the load's tag check can be performed if the store's tag check identifies non-corresponding address/guard tags. By skipping the load's tag check, the latency associated with processing the load can be reduced and performance can be improved.

Also, in the event that the tag-check-skip conditions are satisfied, where the tag-checked load operation is a request to return load data from one or more addressed memory system locations which overlap with one or more addressed memory system locations to which store data is to be stored in response to the older tag-checked store operation, the tag-check-skip control circuitry may control the memory access circuitry to allow a forwarded portion of the store data to be returned as at least a portion of the load data before a result of the pending tag check is available for the older tag-checked store operation. Again, as it is possible that the addresses of the load data could overlap with the addresses of the store data for two or more different older tag-checked store operations, in some cases forwarding of store data to use as load data could be performed for more than one older tag-checked store operation. By enabling forwarding of data from an older store operation to a younger load operation, this can improve performance because the corresponding forwarded portion of the store data does not need to be obtained from a cache or memory in response to the load and so can be available faster.

On the other hand, if any of the tag-check-skip conditions are determined not to be satisfied, the tag-check-skip control circuitry may control the tag checking circuitry to perform the given tag check for the tag-checked load operation (even if that given tag check is checking a guard tag associated with the same block of one or more memory system locations as the guard tag being checked for a pending tag check for an older tag-checked store operation). For example, if the address tag associated with the tag-checked load is different to the address tag of the older tag-checked store, then allowing the tag check for the load to be skipped could risk violations of the memory ordering requirements in cases where there is a change to the value of the guard tag between completion of the store and completion of the load (e.g. this might risk both the store and load tag checks passing when in fact one of them should have failed). Hence, by ensuring that the given tag check for the tag-checked load operation is performed in cases when any of the tag-check-skip conditions are determined not to be satisfied, this ensures that memory ordering requirements are respected and security checks enforced by the tag checking are respected.

In cases when any of the tag-check-skip conditions are determined not to be satisfied, a load-operation tag read operation for reading the guard tag from the memory system for use in the given tag check for the tag-checked load operation may be deferred until after a store-operation guard tag read operation has been performed to read the guard tag for use in the pending tag check for the older tag-checked store operation. Again, this may ensure that the memory ordering requirement for the guard tag reads is respected.

In cases when the tag-check-skip conditions are determined not to be satisfied, and so the given tag check is performed for the tag-checked load operation, in some cases the tag-check-skip control circuitry could control the memory access circuitry to defer return of load data in response to the tag-checked load operation until a result of the given tag check is available for the tag-checked load operation. However, in practice it is not actually necessary to defer the return of the load data while awaiting for the result of the given tag check. Other approaches may improve performance by allowing return of the load data in response to the tag-checked load operation before a result of the given tag check is available. This may be acceptable because either the system may be operating in a less precise tag-checking mode where it is not necessary to halt processing when a tag check fails, or the system may be operating in a more precise tag checking mode which has mechanisms for reversing effects of any incorrectly executed operations which proceeded when the corresponding tag check failed. Hence, by allowing return of load data without waiting for the result of the tag check, this can improve processing performance.

The tag checking circuitry may support one or more tag-checking modes of operation. In some implementations only a single mode may be implemented and in that case the tag checking circuitry could always operate in that particular tag checking mode when tag checking is enabled (separately, there could also be a non-tag-checking mode where no tag checks are performed at all).

However, other implementations may support two or more different tag-checking modes of operation, to provide flexibility for the system operator (again, a separate non-tag-checking mode where no tag checks are performed at all could also be supported, separate from the two or more different tag-checking modes). Hence, in the description of the various modes described below it will be appreciated that these could either be the only modes supported or could be one of a range of modes supported that can be selected. The selection of the current mode to operate in could be based on control data set dynamically based on instructions executed by the processing pipeline, or based on control data set during a manufacturing phase, for example.

For example, a first tag-checking mode of operation could be supported. When the tag-checked memory access operation is processed in the first tag-checking mode, the error reporting action may comprise at least one of: signalling an exception, and recording information indicative of the target address specified by the tag-checked memory access operation for which the tag check identifies that the address tag and the guard tag do not correspond. In many cases the first tag-checking mode of operation may implement both of these responses as the error reporting action (so that both the exception is signalled and the target address is recorded). It is also possible for other types of information to be recorded when a tag check fails in the first tag-checking mode of operation. For example, this other information could include an indication of an exception level at which the instruction which caused the failed tag check was executed, a fault status value which may indicate information of the cause of the fault (e.g. a fault type) and so on. The first tag-checking mode of operation can be useful in scenarios where it is desirable to precisely pinpoint the cause of a failed tag check to a particular target address and/or where it is desirable to ensure that software which encounters a memory tag failure cannot continue to execute correctly to preserve the security of information being accessed. For example, the first tag-checking mode could be selected by a software developer during a development phase, or by a system operator if there are particularly high security needs for a particular piece of software or processing platform. The first tag-checking mode can provide greater security and/or better information on the address for which a memory tag failure occurred, but may have greater performance overhead because the tag checks may need to be associated with the processing of a specific instruction rather than being able to be performed asynchronously sometime after the instruction has already been committed, causing more delays in committing the result of an instruction requiring a tag check.

Surprisingly the approach of skipping the given tag check for the tag-checked load operation can be acceptable even if the first tag-checking mode of operation is being used. While one might expect that the given tag check of the load should be performed so that an exception can be signalled or the target address of the faulting instruction can be recorded if necessary, in practice in scenarios when the tag-checked load operation would fail its tag check and the tag-check-skip conditions are satisfied, the older tag-checked store operation would also have failed its tag check and so this can still provide sufficient information for a developer to locate the cause of the tag check failure and then fix the associated memory bug. Similarly, if an exception ends up being signalled in response to the failed tag check on the earlier store, then this may also flush operations associated with the younger tag-check load and cause those operations to be performed again later once any exception handler has processed the exception. Therefore, even in a system which implements the first tag-checking mode of operation, it is possible to skip the given tag check for the tag-checked load operation when the tag-check-skip conditions are determined to be satisfied.

When the tag check is performed for the tag-checked memory access operation processed in the first tag-checking mode of operation, the memory access circuitry may defer committing the tag-checked memory access operation until after the tag check has identified that the address tag and the guard tag correspond for the tag check architecture required by that tag-checked memory access operation. This means that the tag-checked memory access operation could not be marked as committed until the outcome of the tag check has been resolved, and so there is still a possibility that subsequent operations which depend on the tag-checked memory access operation may need to be flushed in the case where a tag check failure is identified. Although commitment of the tag-checked memory access operation is deferred until after the tag check has been performed, it is not necessary to defer return of the load data in response to a tag-checked load operation processed in the first tag-checking mode of operation, as the load data could still be returned and stored in registers to be accessed by dependent instructions while the result of the tag check is still pending, since even if the tag check subsequently failed then an exception may be triggered and this may later cause processing to resume from a point of execution at or older than the tag-checked operation which failed the tag check.

On the other hand, the tag-checked memory access operations could also be processed in a second tag-checking mode of operation. As mentioned above, this could be the only mode in some implementations or could be provided in addition to the first tag-checking mode in other implementations. In the second tag-checking mode of operation, the error reporting action comprises recording a tag check fail indication indicative of the tag check failing for at least one tag-checked memory access operation. The memory access circuitry may allow the tag-checked memory access operation to be committed before a result of the tag check is available. Hence, unlike in the first mode, with the second tag-checking mode the tracking of failed tag checks may be less precise in that it may simply record whether a tag check has failed for at least one tag-checked memory access operation, but need not record the target address which failed its tag check. Also, as tag-checked memory access operations may be allowed to be committed before any tag check results are available then the system may not provide any guarantee that memory accesses in violation of a tag check will be prevented from producing architecturally committed results. For example, the second tag-checking mode may be useful once software is operational in the field, as memory usage errors of the types discussed above may not necessarily be a problem in themselves but may merely provide vulnerabilities which could then be exploited by an attacker. It may not be necessary to prevent software which encounters such bugs from functioning correctly, but instead some use cases may prefer instead simply to record the occurrence of tag check failures and report these to a developer who can then investigate further. Hence, it is not essential that on a tag check failure processing is halted or an exception is signalled, or that a specific address which failed its tag check should be recorded. For example, the error reporting action could simply be setting a flag in a status register which indicates that a tag check failure occurred. The flag could be a sticky flag which, once set, remains set for the rest of a given section of program code, so that some code executed once that section has completed can examine the flag and determine from the sticky flag whether further investigation is needed to determine what memory usage errors may be present.

One might expect that, if the second tag-checking mode of operation is being used, then as memory access operations can be committed without waiting for the tag check then there is no need for the given tag check to be deferred for a tag-checked load operation while waiting for a pending tag check from an older tag-checked store operation. However, that view may be too naïve, since there may still be memory ordering requirements associated with the reads of the respective guard tags checked in the guard tag checks for the older store and younger load, which may need to be respected. Hence, even in a system supporting the second tag-checking mode of operation, one would normally assume that the read of the guard tag for the older tag-checked store operation would need to be completed before a separate read of the guard tag is performed for a younger tag-checked load (even if those operations require tag checks using the guard tag for the same block of one or more memory system locations). However, the inventors recognised that when a number of tag-check-skip conditions are satisfied, including at least that the address tags are the same for the tag-checked load operation and the older tag-checked store operation which architecturally require a tag check for the guard tag for the same block of one or more memory system locations, then it is possible to skip the given tag check for the tag-checked load and so this improves performance even when the second tag-checking mode of operation is being used.

In some implementations it is possible that additional tag-check-skip conditions may be imposed, as well as the condition mentioned earlier regarding the store/load operations both requiring checking of a guard tag for the same block of one or more memory system locations and the condition that the address tags are the same for the tag-checked load and the older tag-checked store. These additional tag-check-skip conditions may not be needed in all tag-checking modes. Some of the additional tag-check-skip conditions may be specific to a particular tag-checking mode.

For example, an additional tag-check-skip condition which could be imposed in the second tag-checking mode could be that the tag-check load operation is processed at the same exception level as the older tag-checked store operation. The apparatus may have two or more tag check fail indication storage locations corresponding to different exception levels (e.g. the different storage locations could comprise separate registers, separate portions within a single register or separate portions distributed across a group of two or more registers). When the tag-checked memory access operation is processed in the second tag-checking mode of operation, the error reporting action which is performed on failure of a tag check may comprise recording the tag check fail indication in one of the tag check fail indication storage locations selected based on a current exception level at which the tag-checked memory access is processed. Providing separate tag check fail indication storage locations for different exception levels can be useful to provide information to developers on whether any failed tag check was caused by user-level or supervisor-level code, for example. Hence, if the tag-checked load operation is processed at a different exception level to the older tag-checked store operation then the tag check for the load cannot be delegated to the store, as the store would be updating a different tag check fail indication storage location to the load, and so in that case it may be desirable not to skip the given tag check for the tag-checked load operation even if other tag-check-skip conditions are satisfied, so that the given tag check for the subsequent load can cause setting of the appropriate tag check fail indication associated with the exception level in which the tag-checked load is processed, if necessary on a failed tag check.

It will be appreciated that in implementations or tag-checking modes which do not provide separate locations per exception level for recording the occurrence of tag check failure in different exception levels, this additional tag-check-skip condition may not be applied.

Similarly, there may be separate tag check fail indication storage locations corresponding to different virtual address regions, so that when the tag-checked memory access operation is processed in the second tag checking mode of operation, the error reporting action comprises recording the tag check fail indication in one of the tag check fail indication storage locations selected based on the virtual address region which comprises a virtual address corresponding to the target address of the tag-checked memory access. Again, the different storage locations could comprise separate registers, separate portions within a single register or separate portions distributed across a group of two or more registers. Unlike in the first tag-checking mode of operation where the error reporting action may include recording the virtual address specified as the target address of the memory access which failed the tag check, in the second mode there may be no precise identification of the specific address which caused a failed tag check. Although it is possible to simply record a single tag check fail indication covering the entire virtual address space which simply indicates whether a tag check has failed for any address anywhere in the virtual address space, by providing multiple tag check fail indications stored in different locations which correspond to different virtual address regions, this provides more information for identifying the cause of the tag check failure since the setting of the tag check fail indication for a particular virtual address region may help the developer identify that the error is somewhere within that virtual address region and not within other regions.

However, it is possible that load/store operations with target addresses corresponding to different virtual address regions could have those virtual addresses translated into the same or overlapping physical addresses (address translation data may provide a many to one mapping of virtual addresses to physical addresses in some cases). Therefore, it is not guaranteed that a store/load pair which have overlapping (physical) target addresses would have the corresponding virtual addresses in the same virtual address region. As different storage locations would be updated depending on the virtual address region associated with the target address of the memory access for which a tag check fails, then if the virtual address corresponding to the target address of the tag-checked load operation is in a different virtual address region to the virtual address associated with the target address of the older tag-checked store operation, then even if other tag-check-skip conditions are satisfied, it may be desirable to prevent the given tag check for the tag-checked load operation being skipped because it is not possible to delegate the load's tag check to the store as if the store's tag check fails then the store would be updating a different tag check fail indication storage location to the location architecturally required to be updated if the load's tag check fails. Hence, in the second tag-checking mode, the tag-check-skip conditions may also comprise a condition requiring that the tag-checked load operation is associated with a target address in the same virtual address region as the target address associated with the older tag-checked store operation.

Again, it will be appreciated that in implementations or tag-checking modes which do not provide separate locations per virtual address region for recording the occurrence of tag check failure associated with virtual addresses in different virtual address regions, this additional tag-check-skip condition may not be applied. For example, this additional condition may not be needed in the first tag-checking mode, because in that mode the virtual address of the target address that fails its tag check may be recorded in the same storage location regardless of what virtual address region the address falls in, so it is possible for the load to delegate its tag check to the older store even if the target addresses of the load and store are in different virtual address regions.

Another example of an additional tag-check-skip condition used in at least one tag-checking mode (e.g. the second tag-checking mode only, the first tag-checking mode only, or both the first and second tag-checking modes) may be that all portions of load data to be returned in response to the tag-checked load operation are available from store data of one or more pending older tag-checked store operations, and so can be returned without needing to access further load data from a cache or memory storage unit of the memory system. If the tag-checked load is accessing some data that has to come from the cache or memory which does not overlap with any store data available from one or more pending older tag-checked store operations, then it is possible that the additional data that has to be obtained from the cache or memory storage unit could span into a different tag granule from the data which overlaps with the store data of the one or more pending older tag-checked store operations, and so the load may require an additional tag check using a different guard tag value compared to any guard tags that are already being checked for the older stores. However, determining whether that additional tag check is actually required may be relatively complex (requiring assessment of the alignment of the store/load addresses relative to a tag granule boundary). In practice, the performance benefit of skipping the given tag check for the load may be more significant in cases where all data required by the load can be forwarded from store data of pending stores, without needing to access the cache or memory. In cases where the addressed locations targeted by the load do not totally overlap with addressed locations targeted by one or more older stores, then as a cache or memory access is still needed the performance saving of skipping the tag check may be less significant. Therefore, the additional power and circuit area cost of providing circuit logic for determining whether an additional tag check is actually needed for the load may not be considered justified. In the case where all the required load data is available to be forwarded from older stores without accessing the cache/memory (and any other required tag-check-skip conditions are satisfied), it can be guaranteed that the load will not require any additional tag check beyond those covered by other stores, so this can be a simpler way of checking whether it is safe to allow the load not to perform any tag checks at all. Hence, in implementations (or specific tag-checking modes within a given implementation) which apply this additional tag-check-skip condition, in cases where any load data has to be obtained from the cache or memory then no tag check may be skipped at all for the load, even if there is some overlap with tag checks for earlier stores. This may help reduce the complexity of the circuit implementation.

In some examples, this additional tag-check-skip condition could be implemented in some tag-checking modes but not in other tag-checking modes. For example, the additional tag-check-skip condition may be applied in the second tag-checking mode discussed above, but not in the first tag-checking mode. In implementations which do not implement this additional tag-check-skip condition, it might be possible to perform the tag check associated with the portion of the load data that cannot be forwarded from earlier stores regardless of whether that load data is in a different tag granule from tag granules for which tag checks are already to be performed for the earlier stores—this avoids the cost of providing the circuit logic for identifying whether the load requires a check in the tag granule. For the first tag-checking mode, the signalling of an exception on a failed tag check may mean that, even if an additional tag check is performed for the load for part of the load data which does not overlap with the store data for any older pending store, but it turns out that this additional tag check is actually using a guard tag for the same tag granule as the guard tag checked in a tag check for one of the older stores, a possible memory ordering violation (that could arise if the guard tag read for the load's tag check bypasses the guard tag read for the store's tag check for the same tag granule) may not cause lasting incorrect results in the case where the other tag-check-skip conditions are satisfied (both store and load use the same address tag), as there may be a mechanism in the first tag-checking mode for ensuring that a load which bypasses the earlier store's tag check is flushed and re-executed if a tag check fails. In contrast, in the second tag-checking mode there may be no flush/retry mechanism, and so it may be more significant to apply the additional tag-check-skip condition regarding whether all load data can be forwarded from earlier stores in the second tag-checking mode.

Nevertheless, in other examples, the additional tag-check-skip condition regarding whether the load can obtain all portions of load data from store data of older stores may be applied in all modes.

In other examples, this additional tag-check-skip condition may not be applied in any tag-checking mode. For example, some implementations may provide circuit logic which can determine whether an additional tag check for the load is needed for a tag granule not already covered by one or more older stores, and in that case the additional tag-check-skip condition about whether all of the load data can be forwarded from older stores may not be required. Hence, in any mode which does not apply the additional tag-check-skip condition regarding whether the load can obtain all portions of load data from store data of older stores, the tag-check-skip control circuitry may be allowed to determine that the tag-check-skip conditions are satisfied even when a portion of load data to be returned in response to the tag-checked load operation is not available from store data of one or more pending older tag-checked store operations, and so is to be obtained from a cache or memory storage unit of the memory system.

Another mode which can be supported is an asymmetric tag-checking mode of operation, which treats tag-checked load operations differently from tag-checked store operations. Effectively, in the asymmetric mode, tag-checked load operations may be processed according to the first tag-checking mode described above while tag-checked store operations may be processed according to the second tag-checking mode described above.

Hence, when the tag-checked memory access operation is to be processed in an asymmetric tag-checking mode of operation, then: when the tag-checked memory access operation is a tag-checked load operation, the error reporting action comprises recording in a first storage location information indicative of the target address specified by the tag-checked memory access operation for which the tag check identifies that the address tag and the guard tag do not correspond; and when the tag-checked memory access operation is a tag-checked store operation, the error reporting action comprises recording a tag check fail indication in a second storage location, the tag check fail indication indicative of the tag check failing for at least one tag-checked memory access operation, and the memory access circuitry is configured to allow the tag-checked memory access operation to be committed before a result of the tag check is available.

When the tag-checked load operation is processed in the asymmetric tag-checking mode of operation then the tag-check-skip control circuitry may determine that the tag-check-skip conditions are not satisfied (regardless of whether any of the other tag-check-skip conditions are satisfied). This is because in the asymmetric tag-checking mode different storage locations would be updated when a tag check fails for a tag-checked load compared to a tag-checked store, and so for similar reasons to the additional tag-check-skip conditions described in the examples above for the second tag-checking mode of operation, it may be desirable not to allow skipping of the given tag check for the tag-check load operation when in the asymmetric tag-checking mode, to ensure that if a tag check would fail for the load then the failure is recorded in the first storage location rather than the second storage location that would be updated if the store's tag check fails.

Nevertheless, in the asymmetric tag-checking mode, in cases where the tag-checked load operation requests return of load data from one or more address memory system locations which overlap with the memory system locations to which store data is to be stored in response to an older tag-checked store operation, then the load-operation tag read operation for the tag-checked load may be deferred until after the store-operation guard tag read operation has been performed for the store (to ensure respecting memory ordering requirements), but it is not necessary to defer return of the load data itself. The load data for the tag-checked load operation may be allowed to be returned for use by subsequent instructions before the result of the given tag check is available, even when the given tag check is being performed in the asymmetric tag-checking mode of operation.

In some implementations, all memory access operations may by definition be considered to be tag-checked memory access operations. In other implementations it may be possible to define tag-checked memory access operations and non-tag-checked memory access operations. The non-tag-checked memory access operations are those memory access operations for which there is no architectural requirement to perform a tag check, while the tag-checked memory access operations are memory access operations for which a tag check is architecturally required (although at a micro-architectural level it is still possible to skip the tag check for a tag-checked load operation when the tag-check-skip conditions are determined to be satisfied, as described above).

The tag-checked memory access operations could be distinguished from non-tag-checked memory access operations in different ways. In some cases, memory access instructions may have an encoding which signals whether the corresponding memory access operation should be processed as a tag-checked memory access operation or a non-tag-checked memory access operation. For example, a different opcode could be allocated for tag-checked memory accesses compared to non-tag-checked memory accesses, or another field in the instruction encoding could specify whether the tag-check is architecturally required. Another option is that tag-checked and non-tag-checked memory access operations may be triggered by instructions having the same encoding, but control data in a control register could indicate whether the memory access operations should be treated as tag-checked memory accesses or non-tag-checked memory accesses. For example a mode status value in a control register may specify whether the system is currently operating in a tag-checking mode (which could be any of the tag=checking modes described above) or in a non-tag-checking mode. Another option could be that control data (e.g. translation tables) may be defined to specify one or more virtual address ranges for which tag checks should be performed, and in that case any memory accesses triggered by instructions having a target address within those virtual address ranges could be treated as tag-checked memory address operations, while memory access operations having target addresses outside any tag-checking ranges defined in the control data could be treated as non-tag-checked memory access operations. Another approach could be that it is the program counter (instruction address) of the memory access instruction which is compared with the defined virtual address ranges to determine whether to treat the memory access as a tag-checked or non-tag-checked memory access. Hence, it will be appreciated that there are a variety of ways in which an architecture could enable selection of whether particular memory access operations are tag-checked or non-tag-checked accesses.

In the tag check performed for a particular tag-checked memory access operation, the tag check determines whether the address tag and the guard tag correspond to each other. In some cases this may be a check of whether the address tag equals the guard tag. However, it is also possible to provide some transformation of one or both of the address tag and the guard tag for the purpose of the comparison. For example, some systems may provide remapping data which translates the address tag specified for a given address into a corresponding value to be compared against the guard tag stored in memory (or alternatively, which translates the guard tag read from memory before comparing it with the address tag). Also, in some architectures there may be support for defining a "match all" value of the address tag or the guard tag which can be considered to correspond with any value of the other tag (this could be useful for allowing certain regions of the address space to be defined which should never trigger a tag check violation, or for allowing certain memory access instructions to access all memory regardless of the guard tag associated with that region of memory). Hence, the tag check may determine whether the address tag has a value which can be considered to correspond with the guard tag so that the tag check can pass, but the precise rules for determining whether the address tag and the guard tag corresponds may in some cases be a condition other than simply whether the address tag exactly equals the guard tag. The claimed technique is not limited regarding the exact conditions required for determining whether the address tag and the guard tag correspond and any approach can be taken for this.

The guard tags associated with blocks of one or more memory system locations can be stored in the addressable portion of the memory system, at other addresses different from the addresses of the addressed memory system locations with which the guard tags are associated. Alternatively, some non-addressable storage may be provided to store the guard tags, with the non-addressable storage not being available for access by general memory access instructions (instead access to the non-addressable storage may be restricted to tag check reads initiated by the tag checking circuitry, and certain dedicated instructions for reading or setting guard tags for blocks of memory). Either approach is possible. With either approach, it is also possible to provide the ability to cache guard tags for faster access, either in the same data cache also used for caching data, or in a dedicated tag cache dedicated to caching guard tags.

Although it is possible in some implementations for each individual addressable memory system location to have a separate guard tag associated with it (distinct from the guard tag associated with other locations), this may create a large overhead in maintaining and checking guard tags for many different memory system locations, so in practice a certain granule size may be defined representing the size of a block of addressable memory locations which share the same guard tag. Hence, even when the tag-checked load operation and the older tag-checked store operation are architecturally required to perform tag checks which involve a guard tag associated with the same block of memory system locations, this does not necessarily mean that the tag-checked load actually overlaps with the store data of the older tag-checked store operation (it is possible that the store and the load could be accessing different non-overlapping portions of data within the same tag granule, depending on the size of the tag granule supported in a particular architecture).

The association between an address tag and the corresponding target address can be implemented in different ways. In some architectures it may be possible for the address tag to be specified in a separate register from any address operands used to generate the target address. However, in some architectures, while virtual addresses or physical addresses may be specified with a certain number of bits (e.g. 64 bits), a given hardware device may not in practice need so much memory capacity that it would use all the possible addresses which can be represented using that number of bits. For example, with current trends in device usage there is not yet any need to provide $2^{64}$ individual addressable locations. Therefore, often some bits of the memory addresses may effectively be unused and may either always have the same value, or be set as a sign extension of the most significant "real" address bit (so that the unused portion is set to all 0s or all 1s). This unused portion can therefore be reused to represent the address tag or a value for deriving the address tag, to avoid needing to access a separate register in order to obtain the address tag, and also to make it easier to track the correspondence between the addresses and the corresponding address tags as the address tag may by definition be transported along with the address whenever the address is manipulated or moves between registers.

In embodiments which use a portion of the target address to determine the address tag, note that this address tag is different to a tag portion of the target address which may be used by caches to determine whether the information from the addressed location identified by the target address is stored within the cache. Many caching schemes may store a tag portion of the address of a cached piece of data alongside that data within the cache, so that on searching the cache for a given address, part of the address can be compared with the tags stored alongside the cached data in order to determine whether the cached data actually corresponds to the required address. However, in this case the tag portion of the address, which is compared with the tag in the cache, would be part of the portion of the address which actually identifies the particular addressed location for which the data is required, i.e., changing the cache tag portion of an address would by definition result in the address pointing to a different addressed location within the memory system. In contrast, with the address tag used for a tag-guarded memory operation, the memory access circuitry may select the addressed location for which data is required independent of the address tag. That is, even if the address tag is set to different values, the addressed location referenced by the target address may still be the same, as the selection of the addressed location may depend only on other portions of the target address. This gives the freedom for compilers to set the address tags associated with particular addresses to any value to match the corresponding guard tag values which have been allocated to the relevant blocks of data in the memory system.

FIG. 1 schematically illustrates an example of a data processing apparatus 2. It will be appreciated that this is simply a high level representation of a subset of components of the apparatus and the apparatus may include many other components not illustrated. The apparatus 2 comprises processing circuitry 4 for performing data processing in response to instructions decoded by an instruction decoder 6. The instruction decoder 6 decodes instructions fetched from an instruction cache 8 to generate control signals for controlling the processing circuitry 4 to perform corresponding processing operations represented by the instructions. The processing circuitry 4 may include one or more execution units for performing operations on values stored in registers 14 to generate result values to be written back to the registers. For example the execution units could include an arithmetic/logic unit (ALU) for executing arithmetic operations or logical operations, a floating-point unit for executing operations using floating-point operands and/or a vector processing unit for performing vector operations on operands including multiple independent data elements. The processing circuitry also includes a memory access unit (or load/store unit) 15 for controlling transfer of data between the registers 14 and the memory system. In this example, the memory system includes the instruction cache 8, a level 1 data cache 16, a level 2 cache 17 shared between data and instructions, and main memory 18. It will be appreciated that other cache hierarchies are also possible—this is just one example. A memory management unit (MMU) 20 is provided for providing address translation functionality to support memory accesses triggered by the load/store unit 15. The MMU has a translation lookaside buffer (TLB) 22 for caching a subset of entries from page table stored in the memory system 16, 17, 18. Each page table entry may provide an address translation mapping for a corresponding page of addresses and may also specify access control parameters, such as access permissions specifying whether the page is a read only region or is both readable and writable, or access permissions specifying which privilege levels can access the page.

Figure 2:
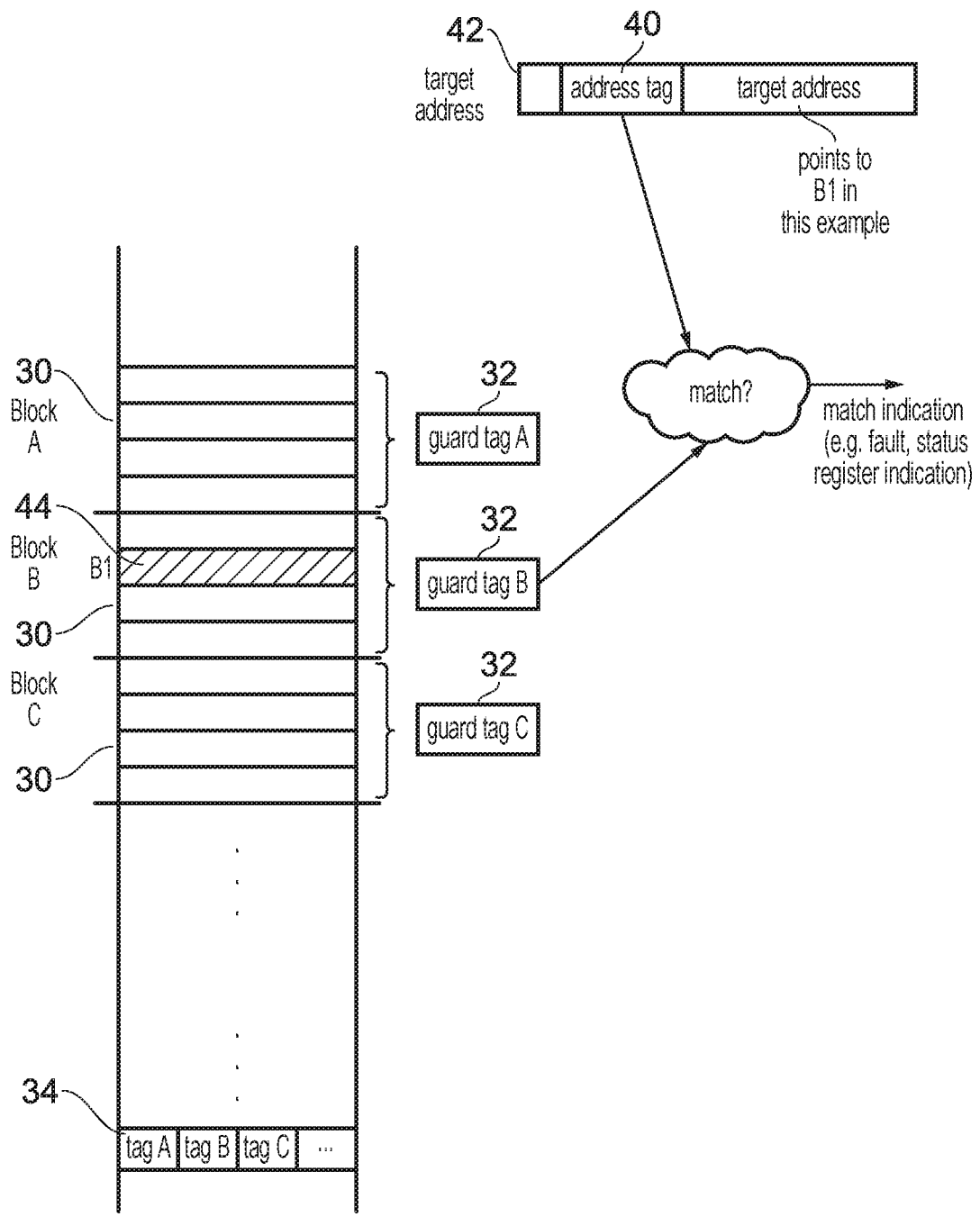
FIG. 2 shows an example of a tag check for checking a guard tag associated with a memory system location to be accessed and an address tag associated with the target address of a memory access operation.

FIG. 2 schematically illustrates a concept of tag-guarded memory accesses. The physical address space used to refer to memory locations within the memory system may be logically partitioned into a number of blocks 30 (or 'tag granules') each comprising a certain number of addressable locations. For conciseness, in the example of FIG. 2, each block 30 comprises four memory locations, but other block sizes could be used as well. Each block 30 is associated with a corresponding guard tag 32. The guard tags associated with a certain number of blocks 30 can be gathered together and stored either within a different architecturally accessible memory location 34 within the physical address space, or within additional storage locations provided in main memory 18 which are not architecturally accessible (not mapped to the same physical address space). The use of separate non-architecturally accessible storage may in some cases be preferred to avoid using up space in the data caches 16, 17 for caching guard tag values, which could impact on the performance of the regular code and could make coherency management more complex. An additional tag cache 19 could be provided in the micro architecture for caching tag values from the non-architecturally accessible storage, for faster access than if the tags had to be accessed from main memory 18. Alternatively, other implementations may cache tags in the data caches 16, 17 themselves, alongside caching of data. The instruction decoder 6 and processing circuitry 4 may support guard tag reading instructions for reading guard tag values associated with particular address or range of addresses, and guard tag setting instructions for setting the guard tag values associated with a particular address or range of addresses.

The particular mapping of which tag storage locations 34 correspond to each block 30 may be hardwired or could be programmable. While in FIG. 2 each tag 32 is associated with a block of physical addresses, it would also be possible to provide guard tags 32 associated with virtual memory locations in a virtual memory address space, but this may require some additional address translations on each memory access. Hence by associating the guard tag 32 with physical memory locations this can improve performance. In general it is a choice for the particular architecture exactly how the guard tags 32 are associated with the corresponding blocks 30 of the physical address space. In general, all that is required is that the guard tag 32 associated with a given block of memory can be accessed and compared.

Hence, when a tag-guarded memory access is required, an address tag 40 (which is associated with the target address 42 identifying the addressed location 44 to be accessed), is compared against the guard tag 32 which is associated with the block of memory locations 30 which includes the addressed location 44. For example, in FIG. 2 the target address 42 points to a certain location B1 in memory, marked 44 in the address space of FIG. 2. Therefore, the guard tag B which is associated with the block of locations B including location B1 is compared against the address tag 40 associated with a target address 42. As shown in the top of FIG. 2, the address tag 4 may be determined as a function of selected bits of the target address itself. In particular, the address tag may be determined from bits within a portion of the target address which is unused for indicating the specific memory location which is to be selected as the addressed location 44. For example, in some architectures the top portion of bits of the target address may always have a certain fixed value such as a sign extension (all 0s or all 1s) and so an address can be tagged with the address tag 40 by overwriting these unused bits with an arbitrary tag value. The particular address tag value can be selected by a programmer or compiler, or can be randomly selected as discussed below, for example. The address tag and guard tag 32 can be a relatively small number of bits, e.g. 4 bits, and so need not occupy much space within the memory and within the target address. Providing 4 bits of tag space, i.e. 16 possible values of the tags, can often be enough to detect many common types of memory access errors.

Hence, when a tag-guarded memory access is performed, the load/store unit 15 compares the address tag 40 and the guard tag 32 associated with a block 30 including the addressed location 44 and determines whether they match. The load/store unit 15 generates a match indication indicating whether the address tag 40 and the guard tag 32 matched. For example, this match indication could be a fault signal 60 which is generated if there is a mismatch between the address tag 40 and the guard tag 32, or an indication placed in a status register indicating whether there was a match, or an entry added to an error report to indicate the target address for which the error was detected and/or the instruction address of the instruction which triggered the error.

Figure 3:
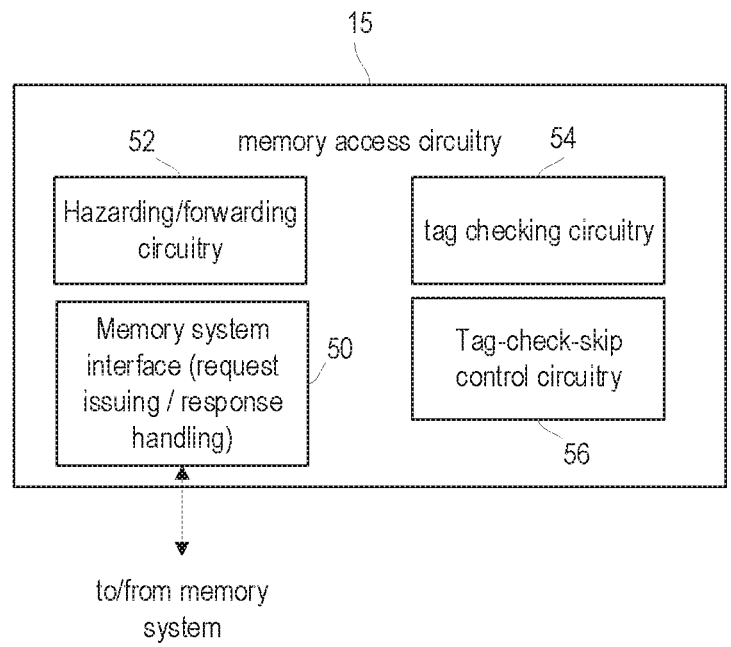
FIG. 3 illustrates memory access circuitry.

FIG. 3 schematically illustrates the memory access circuitry (load/store unit) 15 in more detail. The memory access circuitry includes a memory system interface 50 which is responsible for issuing data access requests to the memory system 16, 17, 18 and for handling responses received from the memory system 16, 17, 18. For example a memory system interface 15 may send out data read requests to read data from the caches 16, 17 or main memory 18, and when a response to those requests is received may control the load/store unit 15 to write data to the registers 14. Similarly, for store instructions the memory system interface 15 may control issuing of write requests to the memory system 16, 17, 18.

The memory access circuitry 15 has hazarding/forwarding circuitry 52 to manage control of hazard checking for memory access operations. When one memory access operation accesses addresses which overlap with another pending access then it may be needed to enforce certain ordering requirements to comply with the instruction set architecture, and also there may be some opportunities for performance gains, such as by forwarding store data from a pending store operation to a pending load operation to avoid that data needing to be read out from the memory system 16, 17, 18. The hazarding/forwarding circuitry 52 may check addresses specified by respective load or store operations and determine when any hazarding conditions require one or more of those requests to be deferred and/or may identify any opportunities for forwarding.

The memory access 15 has tag checking circuitry 54 for performing the tag checks of the type described in the example of FIG. 2, and tag-check-skip control circuitry 56 for determining whether certain tag-check-skip conditions are satisfied for a particular tag check to be performed in response to a tag-checked load operation. These are discussed in more detail below.

Figure 4:
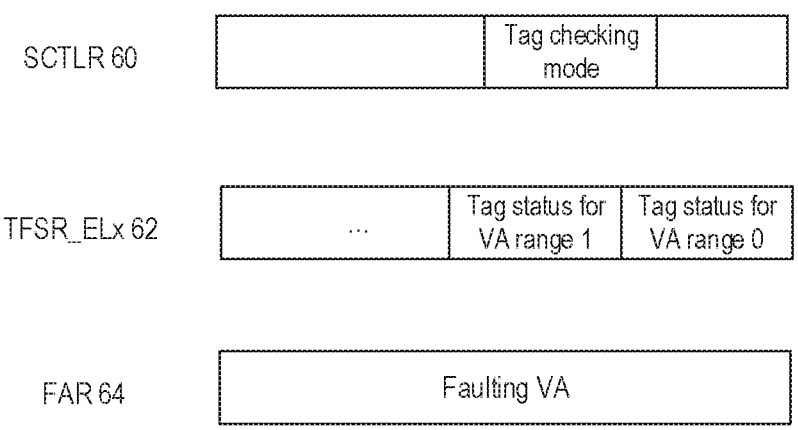
FIG. 4 illustrates an example of system registers.

FIG. 4 shows an example of some control registers which may be included among the registers 14 of the processor 2. FIG. 4 only shows a subset of the control registers which are relevant to the tag checking. It will be appreciated that there may be many other types of registers provided as well, that are not shown in FIG. 4.

Figure 5:
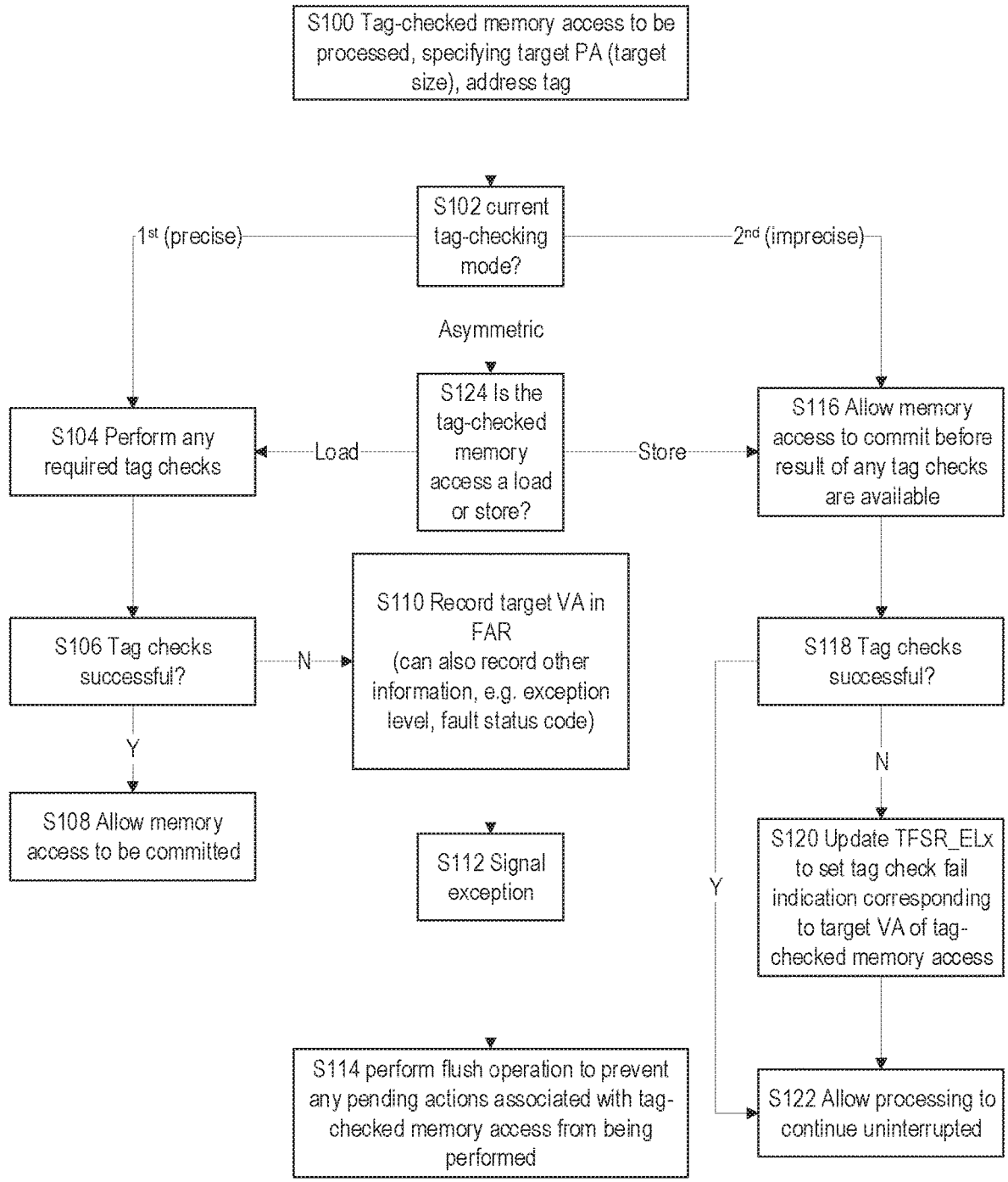
FIG. 5 is a flow diagram illustrating a method of performing tag checking.

As shown in FIG. 4, the registers 14 include a system control register (SCTLR 60) which provides system control information for controlling the operation of the processor 2. As well as storing other information not shown in FIG. 4, the system control register 16 may store a tag checking mode control value which is used to control the tag-checking mode of operation in which the tag checking circuitry 54 is operating. The tag checking mode control value can be set by instructions executed by the pipeline (in some cases only instructions executed at a certain exception level or higher may be allowed to set the tag checking mode indicating value), or could be fixed at a manufacturing stage for a given device. The tag checking mode could be selected from among a number of modes including a precise mode, an imprecise mode and an asymmetric mode as shown in the example of FIG. 5 discussed further below. In some cases, the tag checking mode value could also be set to a value which indicates that no tag checking is enabled at all, and in the non-tag-checking mode then any tag checks may be suppressed and all memory accesses could be treated as non-tag-checked memory access operations.

The registers 14 also include a tag-check fault status register (TFSR) 62 and a fault address register (FAR) 64. These registers can be used for recording tag check failure indications in the case where the tag check identifies that the address tag for the access does not correspond with the guard tag for the corresponding block of memory system locations being accessed. One or both of the TFSR 62 and FAR 64 could be banked per exception level so that different instances of the register are provided in hardware corresponding to different exception levels, in which case instructions executing at a given exception level may cause the tag failure indication in a corresponding banked version of the register corresponding to the exception level at which that instruction was executed. Alternatively, in some cases one or both of these registers (e.g. FAR 64) could be shared between exception levels so that tag failures at multiple exception levels may result in setting of information in the same control register (e.g. FAR 64).

Whether the TFSR 62 and FAR 64 is updated when a tag check fails depends on the current tag-checking mode selected. In an imprecise (second) tag-checking mode the TFSR 62 is used to record instances of tag failure, without identifying the specific address for which the tag check failed. The TFSR 62 may include a number of tag status indications corresponding to different virtual address (VA) ranges. For example, FIG. 4 shows two tag status indications, one for a first VA range 0 and another for a second VA range 1. For example, the most significant meaningful bit of the virtual address of a memory access could be used to select whether, on a tag check failure for that access, the updated tag status indication is the tag check status indication for VA range 0 or VA range 1. Here, the most significant "meaningful" bit may be the most significant bit that is actually used to select which addressed location in memory is accessed. More generally it would be possible to define a TFSR 62 with more than two different tag status values corresponding to different VA ranges. If $2^N$ status indications are provided in the TFSR 62 (or spread across multiple registers if they do not fit in one register), then the particular status indication that is updated when a tag check failure occurs may be selected based on the most significant N meaningful bits of the target VA of the access for which the tag check failure occurred. The tag status indications in the TFSR 62 are "sticky", in that once a given tag status indication has been set somewhere in a program then it retains that set value regardless of whether subsequent tag checks pass or fail (until it is overwritten by one of a set of special instructions that clear the status field, or until a reset event or other event which causes the sticky bit to be cleared occurs).

In contrast, in a precise (first) tag-checking mode, the TFSR 62 is not used to record tag check failures. Instead, if a tag check fails when the address tag and guard tag do not correspond, then the VA corresponding to the target address of the memory access which caused the tag check failure may be recorded in the FAR 64 and an exception may be triggered. In the precise tag-checking mode a tag-checked memory access may not be allowed to commit until the tag check is determined to have passed. In contrast, with the imprecise mode a tag-checked memory access may be allowed to proceed and commit without waiting for the result of the tag check to be available. The FAR 64 may be the same register which may record faulting virtual addresses for other types fault, not just for tag check failures. For example on a fault caused by an event such as an address permission fault identified by the MMU 20, or other types of exceptions associated with particular addresses, the address associated with the fault could be recorded in the FAR 64. It will be appreciated that FIG. 4 does not show all the information that may be recorded when a tag check fails. Other information that could be recorded could be the exception level at which the instruction which caused the tag check failure was executed and a fault status value which identifies the type of fault that occurred.

FIG. 5 shows a flow diagram illustrating a method of controlling tag checking. At step S100 the memory access circuitry 15 identifies a tag-checked memory access to be processed. The memory access operation specifies a target physical address (PA), which is obtained by the MMU 20 based on translation of a target virtual address (VA). Optionally a target size may also be specified by the memory access operation. The target size identifies the size of the data to be loaded if the memory access is a load operation or stored if the memory access operation is a store operation. If variable size accesses are not supported, then it is not necessary to specify the size. Also, the tag-checked memory access operation specifies an address tag value. In the example of FIG. 2 the address tag is specified as address tag bits 40 within an upper portion of the target address 42 (e.g. in a portion of the address which does not record meaningful address bits, e.g. because while the addresses are specified as 64-bit addresses, the implemented address space only requires a smaller amount of address space, e.g. based on 48 meaningful address bits for example). Hence, the portion of the address which includes the address tag 40 may not be used to select the actual memory location to access and may not be translated by the MMU during virtual to physical address translation. Alternatively, other implementations could provide the address tag 40 separately from the target address 42, such as in a separate tag value register referenced by the memory access instruction. However, it can be more convenient to record the address tag 40 in the upper bits of the target address 42 which are not used for selecting the particular address location to be accessed in the memory system, so that the address tag 40 is, by definition, passed along with the address itself when it is calculated or transferred between registers/memory.

At step S102 the tag checking circuitry 54 checks the tag checking mode indicating value in the control register 60 to determine what mode is the current tag checking mode.

Although not shown in FIG. 5, if a current mode is a non-tag-checking mode then no tag checks are needed at all and so the memory access can be handled as normal without the need for any tag checks.

If the current tag checking mode is the first (precise) tag-checking mode then at step S104 the tag checking circuitry 54 performs any required tag checks for the memory access operation. If the guard tag values 32 required for such tag checks are present in the data cache 16 or tag cache 19 then they can be accessed relatively quickly, but if not then they may need to be accessed from a further level cache 17 or main memory 18. It is possible that the same memory access operation may require tag checks involving two or more different guard tags, for example if the data to be loaded or stored in response to the memory access crosses the boundary between different tag granules 30. Hence, some operations may only require one tag check and others may require more than one. At step S106 it is determined whether any performed tag checks were successful. A tag check is successful if the tag checking circuitry 54 determines that the address tag specified by the tag-checked memory access corresponds to the guard tag associated with a corresponding block of addressed memory system locations that is targeted by the memory access. This does not necessarily mean that the address tag has to exactly equal the guard tag (as described above there are a number of scenarios when an address tag could be considered to correspond to a guard tag even if they specify different values). If the required tag checks are successful then at step S108 the memory access is allowed to be committed. Note that while the memory access cannot be committed until step S108 after the tag checks are determined to be successful, when a memory access is processed in the first tag-checking mode, this does not necessarily prevent requests being issued to the memory system for that memory access. It is possible for a request to load data from memory to be issued at step S104 while awaiting the results of tag checks, since even if a tag check is subsequently determined to be unsuccessful then an exception may be signalled and this will prevent any subsequent incorrect processing based on the loaded data. In some implementations of the precise mode, it may be desirable to defer issuing write requests to store data to the memory system for a given block of memory system locations until after the corresponding tag check has been determined to be successful, to prevent pollution of memory with data from a store which failed its tag check.

If at step S106 it is determined that any of the tag checks were unsuccessful (that is, the address tag did not correspond to the corresponding guard tag) then at step S110 the virtual address corresponding to the target address of the tag-checked memory access is stored in the fault address register 64. It is also possible to record other information, such as the current exception level and the fault status code indicating the type of fault that occurred. At step S112 an exception is signalled to cause an exception handler to execute and perform a recovery action. At step S114 the exception causes the processing pipeline to perform a flush operation to prevent pending actions associated with tag-checked memory access which failed its tag checks from being performed. This flush will also prevent younger operations dependent on the operation which failed the tag check being committed. Hence, the first (precise) tag-checking mode enables the system to more precisely identify the precise address which caused the tag check to fail which can provide more information available for developers, and ensures that the program flow can be halted by signalling the exception to prevent further incorrect processing after the tag check failure was identified.

However, the precise mode of tag-checking defers commitment of memory access operations until after the tag checks have been identified to be successful. This may take some time as the tag checks may require reads to the memory system to obtain the required guard tags, and so has a performance impact.

A second (imprecise) tag-checking mode is therefore provided which can enable tag checking with less performance impact but does not allow the location of the failed tag check to be identified as precisely. When at step S102 the current tag-checking mode is determined to be the imprecise tag-checking mode then at step S116 the memory access circuitry 15 allows the tag-checked memory access to be committed before result of any of its tag checks are available. Hence, the memory access can be committed and any younger dependent operations may themselves be committed even if the tag check is still outstanding and waiting for a guard tag to be read out from memory. Eventually once the tag check can be performed when the guard tag is available then at step S118 the tag check is performed by the tag checking circuitry 54 and if the tag check is unsuccessful then at step S120 the tag checking fault status register 62 corresponding to the current exception level ELx is updated to set the tag check failure indication corresponding to the virtual address range that includes the virtual address corresponding to the target PA of the tag-checked memory access. At step S122 the processing is allowed to continue on uninterrupted. There is no need to signal an exception when a tag check fails in the imprecise tag-checking mode.

On the other hand, if at step S118 any tag checks for the tag-checked memory access were determined to be successful then step S120 is omitted and processing continues uninterrupted without setting the tag check failure indication in the TSFR 62.

Some implementations may also support an asymmetric tag-checking mode where loads and stores are handled differently. If at step S102 the current tag-checking mode is determined to be the asymmetric mode, then at step S124 it is determined whether the tag-checked memory access is a load operation or a store operation. If the current access is a load, then the load is handled according to the first (precise) tag-checking mode and the method continues to steps S104-S114 as described earlier. Similarly, if the tag-checked memory access is a store then the store is handled according to the imprecise tag checking mode and so steps S116-S122 are performed.

Figure 6:
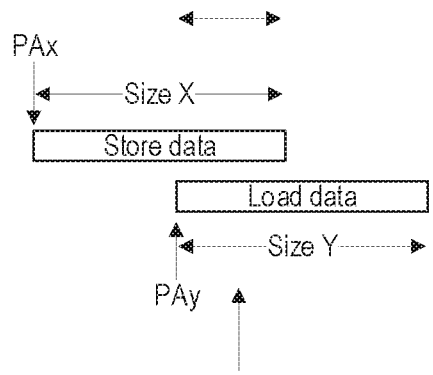
FIG. 6 is a diagram for illustrating an architectural ordering requirement for an older tag-checked store operation and a younger tag-checked load operation.

FIG. 6 shows a scenario which may arise when a tag-checked load operation follows an older tag-checked store operation. Here the term "older" refers to the relative order of the store and the load operations in program order. The processing pipeline may be able to execute the operations out of order, and so the actual order of executing the load and the store may differ compared to the program order. As shown in the lower part of FIG. 6, sometimes the younger load may specify a target address PAy and size Y which overlaps with the address range identified by the physical address PAx and size X of the store operation, so there is an overlapping range of addresses which is targeted by both operations. In this case it may be possible to forward store data from the store operation to the load operation, to avoid needing to read in that data again from the cache or memory. In some cases, the load data may be entirely available from forwarded data from the earlier stores which are pending in the memory access circuitry 15, and so in this case the cache/memory accesses for obtaining the load data can be eliminated altogether.

In cases where there is some overlap in the addresses targeted by the load/store, at least one tag check for the store will check a guard tag associated with the same block of address locations as the guard tag to be checked in at least one tag check for the load operation. While FIG. 6 shows an example where the data actually overlaps for the load and the store, another scenario in which the same guard tag may be used for both tag-checked operations may be if the store data and the load data are for non-overlapping addresses, but where part of the store data relates to data in the same tag granule (block 30 in FIG. 2) as part of the load data. Hence it is not essential for the addresses to actually overlap, but more generally an ordering issue may arise if the load and store both need to use a guard tag for the same tag granule.

In typical systems memory ordering requirements which are implied by the guard tag reads associated with the store and load operations for obtaining the guard tags for the same tag granule can restrict the timing at which the load can be committed even if all of the load data can be forwarded from the store data of corresponding older store operations. This is because an architectural ordering requirement may be imposed, to require that processing the store and the load should give results which are consistent with those which would be achieved if the guard tag read for the store operation was performed before the guard tag read for the load operation. This accounts for the possibility that, in cases where the load requires a guard tag for the same block of addressed locations as the store, it is possible that the guard tag Z for that block could be updated at some point during the processing of the store and load (e.g. as shown in FIG. 6). From an architectural point of view, there may be no requirement for the guard tag update to occur at any particular timing relative to the store and the load (the guard tag update may be implemented in a separate thread of processing executing on a different processor core for example, and there is no architectural limit on the exact timing at which the guard tag is updated). For example it may be perfectly acceptable for the store and load both to execute before the guard tag Z is updated, or for the store and load both to be executed after the guard tag update, or for the store to be executed prior to the guard tag update and the load to be executed after the guard tag. However, what may not be allowed is any result where the load has executed using the old value of guard tag Z before the guard tag update but the store has executed using the new value of the guard tag Z after the update, as in this case a younger instruction would be processed based on an older view of the state of the system than an older instruction in program order, which would be incorrect. To prevent such violations in memory ordering, there may be an architectural requirement that any tag checking performed by the tag checking circuitry 54 should give results which are consistent with the results which would be achieved if the guard tag read for the store operation had been performed before the guard tag read for the load operation.

A simple way of implementing this may be to ensure that the tag checks are serialised and so the tag check for the load would have to be deferred until the tag check for the store has been performed (or at least until the read to memory to get the guard tag required for the store tag check has been carried out). This might therefore be viewed as requiring (in the case where the operations are performed in the precise tag checking mode), the commitment of the younger load to be deferred until the tag check has been performed for the earlier store. However, this may reduce performance and prevent the benefits of being able to forward the portion of store data for use of the load data being seen. In other words, in a naïve approach when there is a younger load and an older store to overlapping bytes, the load may have to wait for the store to perform its tag check before it can complete, to maintain read after read ordering imposed by the architecture, even if it would have been possible to forward store data to the load and allow the load to proceed. This can hurt performance since tag check may be performed post-commit in the store buffer's queues which queue store data awaiting writing to memory.

In contrast, this problem can be addressed by allowing younger loads that have overlapping addresses with older stores to skip its tag check if the address tags for the store and the load are the same (and optionally whether some other conditions are also satisfied). The result of tag check operation would be the same since they both have the same logical tag and are allowed to see the same physical tag and still maintain the read-after-read ordering requirement. Effectively the load delegates its tag check responsibility to the store and this allows the load to complete early. If the store and load have different address tags, the load is hazarded against the store and the tag check for the load cannot be skipped. This solution works for both precise and imprecise tag-checking modes.

Hence, it is recognised that when certain tag-check-skip conditions are satisfied it is not necessary to perform the tag check for the younger load operation at all, or to defer completion of the load until the store's tag check has been passed. This improves performance.

Figure 7:
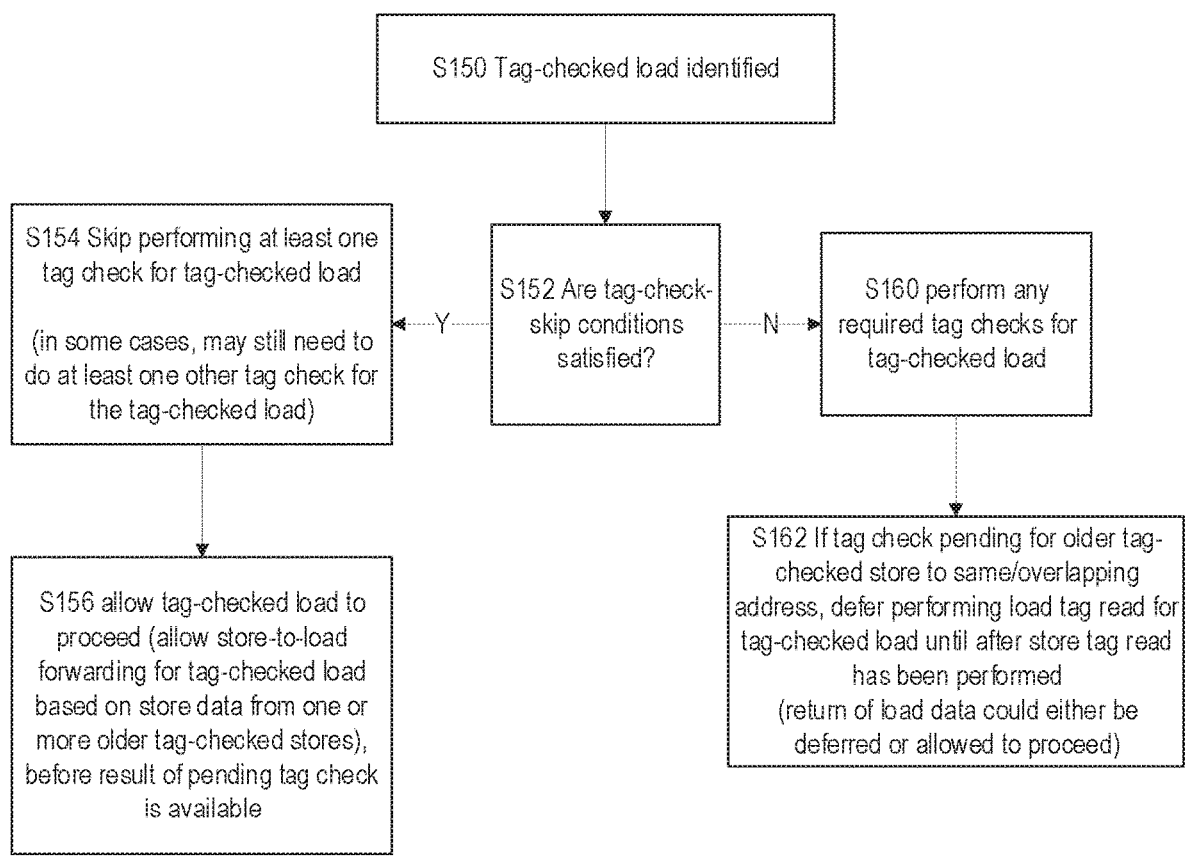
FIG. 7 is a flow diagram showing steps for determining whether to skip performing at least one tag check for a tag-checked load.

FIG. 7 is a flow diagram showing handling of a tag-checked load operation. At step S150 the tag-checked load is identified among the pending memory accesses to be processed by the memory access circuitry 15. At step S152 the tag-check-skip control circuitry 56 identifies whether any tag-check-skip conditions are satisfied. Checking of these conditions is shown in more detail in FIG. 8 described below. If all the required tag-check-skip conditions are satisfied, then at step S154 the tag-check-skip control circuitry 56 controls the tag checking circuitry 54 to skip performing at least one tag check for the tag-checked load. The skipped tag check is a tag check which would be checking the load's address tag against a guard tag for a same block 30 of memory system locations that is also checked in a pending tag check for an older tag-checked store operation. In some cases, even though one tag check may be skipped it may still be needed to perform at least one other tag check for the tag-checked load. For example, in the scenario shown in FIG. 6 with overlapping address ranges then although the tag check may be skipped for the overlapping range if the remaining portion of load data extends into a different tag granule for which no tag check is pending for an older store then the tag check for that portion of the address is targeted by the load may still need to be performed (alternatively, some implementations may only allow the tag-check-skip conditions to be satisfied in cases where all load data for the tag-checked-load can be forwarded from older pending stores, in which case there would be no need to perform any tag checks at all at step S154). At step S156 the tag-checked load is allowed to proceed before a result of any pending tag check is available for the older tag checked store. This includes allowing store-to-load forwarding of store data to use as the load data for the tag-checked load.

On the other hand, if at step S152 any of the tag check skip conditions are not satisfied then at step S160 the tag checking circuitry 54 performs any of the architecturally required tag checks for the tag-checked load, regardless of whether any pending tag checks for older store operations would have used a guard tag for the same tag granule. For example, the tag-check-skip conditions could have failed because this earlier store and the younger load specified different address tags so that it cannot be guaranteed that if the store tag check passes the load tag check would also have passed.

At step S162, if any tag check is pending for the older tag-checked store targeting the same or overlapping addresses as the tag checks for the tag-checked load then any load tag read for the tag-checked load is deferred from being performed until after the store tag read has been performed to obtain the guard tag to be checked in the tag check for the store operation. This ensures that the memory ordering requirements are respected to ensure that the younger load cannot see a view of the relevant guard tag which is older than the view seen by the store operation. Regardless of whether the tag check is still pending for the earlier store, the load data of the tag-checked load itself may still be allowed to be returned, without waiting for the outcome of any tag checks and without waiting for the store tag read to be performed, as the architecture may allow data reads to proceed independent of tag reads without requiring the data reads and tag read to be atomic. Hence the return of the load data could either be deferred until the load tag check can be performed or (preferable to improve performance) could be allowed to proceed without waiting for the tag check read on the store operation, including allowing store-to-load forwarding of data from the store operation to the load operation.

Figure 8:
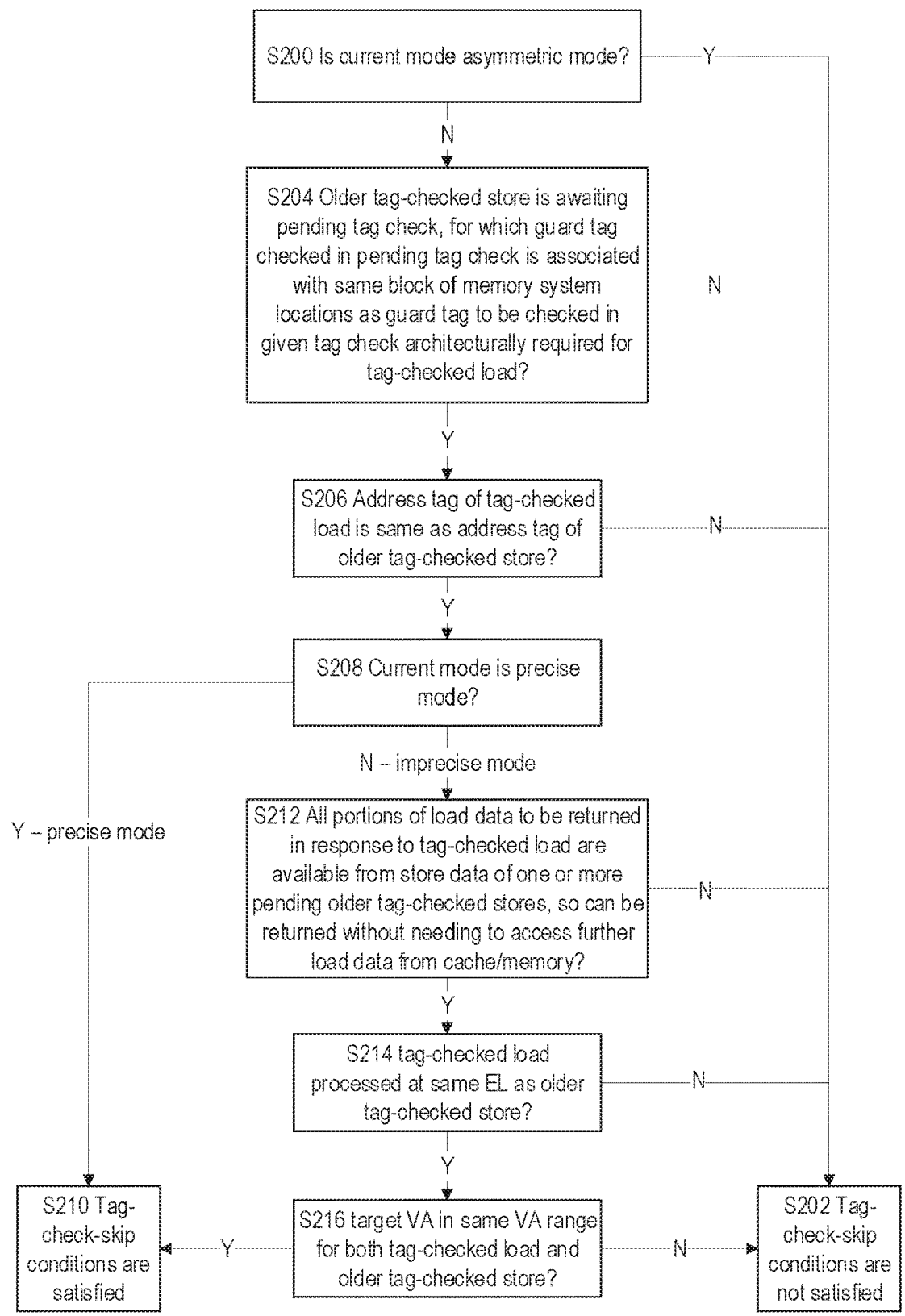
FIG. 8 is a flow diagram showing steps for determining whether tag-check-skip conditions are satisfied.

FIG. 8 is a flow diagram showing in more detail checking of the tag-check-skip conditions at step S152 of FIG. 7. These conditions are evaluated by the tag-check-skip control circuitry 56. At step S200 the tag-check-skip control circuitry 56 determines whether the current mode of operation is the asymmetric tag-checking mode and if so then at step S202 it is determined that the tag-check-skip conditions are not satisfied, regardless of whether any of the other conditions are satisfied. This ensures that no tag check will be skipped for the tag-checked load in cases when the current mode is the asymmetric mode. This recognises that in the asymmetric mode loads and stores are handled differently, as stores will set the TFSR 62 on a tag check failure while loads will set the FAR 64 on a tag set failure, and so it is not desirable for a load to delegate its tag checked to the store as the store would update a different tag status location and so would not provide the architecturally required update to the TFSR 62 needed for a tag check failure on the load.

If the current mode is not the asymmetric mode then at step S204 the tag-check-skip control circuitry 56 determines whether there is an older tag-checked store which is awaiting a pending tag check, for which a guard tag checked in the pending tag check for the store is associated with the same block of memory system locations as the guard tag to be checked in the given tag check which is architecturally required for the tag-checked load currently being considered. There can be a number of ways of evaluating whether this condition is satisfied.

In some implementations, the condition at step S204 may be determined to be satisfied in any case where the tag-checked load requires a tag check for the same tag granule that is also checked in a pending tag check for any of one or more older tag-checked stores (regardless of whether the addresses of the load data to be accessed in the load actually overlap with the addresses of the store data for the store). Evaluating more precisely whether the load requires a check of the same tag granule as the older store(s) can be beneficial to open up more opportunities for allowing tag checks to be skipped. However, in practice in cases where the older store and younger load require tag checks for the same tag granule, but the address ranges do not overlap, the performance benefit of skipping the tag check for the load may be smaller than the performance benefit achieved by skipping the tag check for the load in the case when the address ranges do overlap (as in the case of non-overlapping address ranges, an access to the cache/memory may still be required for the load, so this may slow down processing of the load and dependent operations anyway, while in the case of overlapping address ranges store-to-load forwarding may speed up processing of the load and so there is a greater benefit to skipping the tag check for the load).

Hence, in other implementations, rather than determining exactly whether the load requires a tag check for the same tag granule as an older tag-checked store, it is possible to approximate the condition at step S204, and evaluate this condition based on whether the address range of the load data overlaps with the address range of the store data of at least one older tag-checked store. If there is any overlap between the address ranges of the load data and store data, it can be guaranteed that the load may require a tag check for the same tag granule as an earlier store. This avoids the need to provide circuit logic for evaluating alignment of the load/store target addresses relative to tag granule boundaries, which can be more complex to implement. Hence, in some cases the determination at step S204 may be imprecise, in the sense that it may allow some false negative detections of whether the condition shown at S204 is satisfied—sometimes even though the tag-checked load actually requires a tag check using the guard tag for the same tag granule that is checked in the older store, this may not be detected in the case of non-overlapping address ranges for the store and load. The determination at step S204 may however be implemented to not permit any false positive detections.

Regardless of whether the determination at step S204 is precise or imprecise (based on assessment of whether the address ranges targeted by the store and load overlap), if it is determined that there is no older tag-checked store with a pending tag check involving the guard tag for the same block of memory system locations (recognising that it is possible that this determination could be a false negative and in reality there could be such a store present, but which has not been detected due to the more approximate checking condition implemented), then at step S202 the tag-check-skip conditions are determined not to be satisfied, since in this case the outcome of the tag check for the tag-checked load cannot be guaranteed to be inferred from outcomes from earlier stores and so the tag check should be performed for the tag-checked load.

If at step S204 it is determined that there is an older tag-checked store with a pending tag check awaited based on the same block's guard tag as checked for the tag-checked load, then at step S206 the tag-check-skip control circuitry 56 identifies whether the address tag associated with the target address of the tag-checked load is the same as the address tag associated with the target address of the older tag-checked store. If not, then again at step S202 the tag-check-skip conditions are determined not to be satisfied, because in the case where the store and load have different address tags, the tag checks for the load and the store could provide different outcomes and so it is not desirable to skip the tag check of the load.

If the address tags are the same for the load and the store then at step S208 the current tag-checking mode is identified. If the current mode is the precise (first) tag checking mode then (in this implementation) there are no other tag-check-skip conditions to be satisfied and so at step S210 it is determined that all of the tag-check-skip conditions are satisfied. Therefore, as shown in FIG. 7 it will then be possible to skip the given tag check for the tag-checked load which uses the guard tag for the same block of memory system locations as the guard tag being checked in a pending tag check for an older tag-checked store. This may allow the load to complete earlier and can hence improve performance.

If at step S208 it is determined that the current mode is the imprecise (second) tag-checking mode then some additional tag-check-skip conditions are imposed in this example. At step S212, the tag-check-skip control circuitry may check whether all portions of the load data to be returned in response to the tag-checked load are available from store data of one or more pending older tag-checked stores, so can be returned without needing to access further load data from the cache 16, 17 or memory 18. As mentioned further below, step S212 is optional. However, if step S212 is performed, then if there is any portion of the load data which cannot be forwarded from any available older tag-checked stores then at step S202 the tag-check-skip conditions are determined not to be satisfied. This simplifies the tag checking circuitry because it means that, for a tag-checked load processed in the imprecise mode, the tag checks will either be performed entirely (regardless of how many tag granules are spanned by the load data) or will not be performed at all. By checking the condition at step S212, it is not possible that part of the tag checks for the tag-checked load would be skipped while other parts would still need to be performed. This can simplify the circuit implementation because it avoids the need to provide any circuit logic for determining (based on comparison of addresses with tag granule boundaries) whether the part of the load data that has to be accessed from the cache/memory because it cannot be forwarded from older stores is in a different tag granule or not. This circuit logic can be relatively complex to implement and can be unnecessary in the precise mode, because even if the extra tag check fails for the portion of the load data accessed from the cache because it extends beyond the overlap with the store data, the load can be retried after the older store does its tag check. This is not possible in imprecise mode as the older store can do its tag check post-commit and the load cannot be retried once it is not speculative. Retry is possible only when load is speculative (which is the case in precise mode if there is an older pending store) and not when the load is the oldest (non-speculative) operation and there is a post-commit store that has a pending tag check (which is what we have in imprecise mode). By imposing the condition shown at step S212 this simplifies the circuit logic as it avoids the problem regarding how to ensure there are no memory ordering violations between a pending tag check for the older store and the tag check for the load needed for the portion of data which is accessed from the cache (which could potentially relate to the same tag granule).

Hence, if in the imprecise mode at step S212 it is determined that all portions of the load data required are available from the store data of one or more pending older tag-check stores then the method proceeds to check another tag-check-skip condition. At step S214 it is determined whether the tag-checked load is processed at the same exception level as the older tag-checked store, and if not then again at step S202 the tag-check-skip conditions are determined not to be satisfied. This may account for the fact that there may be different banked TFSR registers 62 corresponding to different exception levels, so that a store at one exception level and a load at another exception level would need to update different storage locations if they fail their tag checks, so that it is not possible for the load to delegate its tag check to an earlier store. In a system which does not bank its TFSR registers 62 for recording the fail status indications for tag checks, so that all exception levels share the same tag check fault status register 62, then step S214 of FIG. 8 could be omitted.

Similarly, at step S216 the tag-check-skip control circuitry 56 determines whether both the tag-checked load being considered and the older tag-checked store for which the pending tag check is awaited have target addresses in the same virtual address range (here the check is based on the virtual address corresponding to the target address, not the physical address). For example, step S216 may compare the bits of the store/load target addresses used to select which of the tag status indications in TFSR 62 would be updated on a tag check failure, and determine whether those bits match for the store/load target addresses. If the target VA is not in the same VA range for both the tag-checked load and the older tag-checked store, then at step S202 the tag-check-skip conditions are determined not to be satisfied since in the imprecise mode instructions with virtual addresses in different ranges would cause different tag status indications to be set and so it is not possible for the load to delegate its tag check to a store accessing a different virtual address range. If the tag-checked load and the older tag-checked store both have their target VAs in the same virtual address range then it is determined at step S210 that the tag-check-skip conditions are all satisfied and so the given tag check can be skipped for the tag-checked load as its check can be delegated to the pending tag check of the store.

It will be appreciated that not all of the steps in FIG. 8 may be needed for some implementations. For example the TFSR 62 in a different implementation may not split its tag status indications into separate VA ranges, could instead simply record a single tag status indication regardless of the virtual address for which the tag check fail is identified, and in that case step 216 would not be necessary and could be omitted.

Also, in some cases step S212 may not be implemented in the imprecise mode. An alternative to imposing this step may be to provide circuit logic which can more precisely determine whether, in the case where the load data includes some additional load data which has to be obtained from the cache as it cannot be forwarded from store data of older pending stores, the additional load data corresponds to a different tag granule to tag granules checked in the older pending stores. In that case, step S212 could be omitted and instead it may be possible to allow the tag check for the additional load data which does not overlap with the store data to proceed while the tag check for the portion of the load data which does overlap with store data could be skipped.

Also, in some cases step S212 may also be implemented in the precise mode. This could simplify the circuit logic by avoiding the need to provide different behaviour for the precise and imprecise modes in the case where the load data cannot be totally forwarded from store data of pending stores.

Also it will be appreciated that FIG. 8 shows the steps in a certain sequential order for ease of explanation, but other approaches could re-order these steps and perform them in different orders if needed.

In the present application, the words "configured to . . ." are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope of the invention as defined by the appended claims.

The invention claimed is:

1. An apparatus comprising:
    memory access circuitry to perform memory access operations to access data stored in a memory system;
    tag checking circuitry to perform at least one tag check for a tag-checked memory access operation for accessing data stored at one or more addressed memory system locations identified based on a target address specified by the tag-checked memory access operation, where the target address is associated with an address tag, and each tag check comprises: determining whether the address tag corresponds to a guard tag stored in the memory system associated with at least a subset of the one or more addressed memory system locations, and performing an error reporting action when the tag check identifies that the address tag and the guard tag do not correspond; and
    tag-check-skip control circuitry to determine whether a plurality of tag-check-skip conditions are satisfied for a tag-checked load operation, the tag-check-skip conditions comprising at least:
        that there is an older tag-checked store operation awaiting a pending tag check, for which a guard tag checked in the pending tag check is associated with the same block of memory system locations as a guard tag to be checked in a given tag check architecturally required to be performed for the tag-checked load operation; and
        that the address tag for the tag-checked load operation is the same as the address tag for the older tag-checked store operation;
    wherein the tag-check-skip control circuitry is configured to control the tag checking circuitry to skip performing the given tag check for the tag-checked load operation when the plurality of tag-check-skip conditions are determined to be satisfied.

2. The apparatus according to claim 1, in which the tag checking circuitry is configured to ensure that, at least when the one or more addressed memory system locations to be accessed in response to the tag-checked load operation overlap with the one or more addressed memory system locations to be accessed in response to the older tag-checked store operation, results of processing the tag-checked load operation and the older tag-checked store operation are consistent with results which would be obtained if any store-operation guard tag read operations for the older tag-checked store operation are completed before performing any load-operation guard tag read operations for the tag-checked load operation;

the store-operation guard tag read operations comprising operations to read one or more guard tags from the memory system for use in any tag checks architecturally required for the older tag-checked store operation; and the load-operation guard tag read operations comprising operations to read one or more guard tags from the memory system for use in any tag checks architecturally required for the tag-checked load operation.

3. The apparatus according to claim 1, in which, when the plurality of tag-check-skip conditions are determined to be satisfied, the tag-check-skip control circuitry is configured to control the memory access circuitry to allow the tag-checked load operation to proceed without waiting for a result of the pending tag check for the older tag-checked store operation.

4. The apparatus according to claim 1, in which, when the plurality of tag-check-skip conditions are determined to be satisfied and the tag-checked load operation is a request to return load data from one or more addressed memory system locations which overlap with one or more addressed memory system locations to which store data is to be stored in response to the older tag-checked store operation, the tag-check-skip control circuitry is configured to control the memory access circuitry to allow a forwarded portion of the store data to be returned as at least a portion of the load data before a result of the pending tag check is available for the older tag-checked store operation.

5. The apparatus according to claim 1, in which at least when the tag-checked memory access operation is processed in at least one tag-checking mode of operation, the plurality of tag-check-skip conditions also comprise:
that all portions of load data to be returned in response to the tag-checked load operation are available from store data of one or more pending older tag-checked store operations, and so can be returned without needing to access further load data from a cache or memory storage unit of the memory system.

6. The apparatus according to claim 1, in which when the tag-checked memory access operation is processed in an asymmetric tag-checking mode of operation:
when the tag-checked memory access operation is a tag-checked load operation, the error reporting action comprises recording in a first storage location information indicative of the target address specified by the tag-checked memory access operation for which the tag check identifies that the address tag and the guard tag do not correspond; and
when the tag-checked memory access operation is a tag-checked store operation, the error reporting action comprises recording a tag check fail indication in a second storage location, the tag check fail indication indicative of the tag check failing for at least one tag-checked memory access operation, and the memory access circuitry is configured to allow the tag-checked memory access operation to be committed before a result of the tag check is available; and
when the tag-checked load operation is processed in the asymmetric tag-checking mode of operation, the tag-check-skip control circuitry is configured to determine that the plurality of tag-check-skip conditions are not satisfied.

7. The apparatus according to claim 6, in which, when the tag-checked load operation is processed in the asymmetric tag-checking mode of operation and the tag-checked load operation is a request to return load data from one or more addressed memory system locations which overlap with one or more addressed memory system locations to which store data is to be stored in response to the older tag-checked store operation, the tag-check-skip control circuitry is configured to control the memory access circuitry to:
defer performing a load-operation tag read operation for reading the guard tag from the memory system for use in the given tag check for the tag-checked load operation until after a store-operation guard tag read operation has been performed to read the guard tag for use in the pending tag check for the older tag-checked store operation; and
allow load data to be returned in response to the tag-checked load operation before a result of the given tag check is available.

8. The apparatus according to claim 1, in which when the tag-checked memory access operation processed in a first tag-checking mode of operation, the error reporting action comprises at least one of:
signalling an exception; and
recording information indicative of the target address specified by the tag-checked memory access operation for which the tag check identifies that the address tag and the guard tag do not correspond.

9. The apparatus according to claim 8, in which when the tag check is performed for the tag-checked memory access operation processed in the first tag-checking mode of operation, the memory access circuitry is configured to defer committing the tag-checked memory access operation until after the tag check has identified that the address tag and the guard tag correspond.

10. The apparatus according to claim 1, in which when the tag-checked memory access operation processed in a second tag-checking mode of operation, the error reporting action comprises recording a tag check fail indication indicative of the tag check failing for at least one tag-checked memory access operation, and the memory access circuitry is configured to allow the tag-checked memory access operation to be committed before a result of the tag check is available.

11. The apparatus according to claim 10, comprising a plurality of tag check fail indication storage locations corresponding to different exception levels, in which when the tag-checked memory access operation is processed in the second tag-checking mode of operation, the error reporting action comprises recording the tag check fail indication in one of the plurality of tag check fail indication storage locations selected based on a current exception level at which the tag-checked memory access is processed; and
when the tag-checked load operation is processed in the second tag-checking mode of operation, the plurality of tag-check-skip conditions also comprise:
that the tag-checked load operation is processed at the same exception level as the older tag-checked store operation.

12. The apparatus according to claim 10, comprising a plurality of tag check fail indication storage locations corresponding to different virtual address regions, in which when the tag-checked memory access operation is processed in a second tag-checking mode of operation, the error reporting action comprises recording the tag check fail indication in one of the plurality of tag check fail indication storage locations selected based on a virtual address region which comprises a virtual address corresponding to the target address of the tag-checked memory access; and
when the tag-checked load operation is processed in the second tag-checking mode of operation, the plurality of tag-check-skip conditions also comprise:
that a virtual address corresponding to the target address of the tag-checked load operation is in the same virtual address region as a virtual address corresponding to the target address of the older tag-checked store operation.

13. The apparatus according to claim 1, in which the tag-check-skip control circuitry is configured to control the tag checking circuitry to perform the given tag check for the tag-checked load operation when any of the plurality of tag-check-skip conditions are determined not to be satisfied.

14. The apparatus according to claim 13, in which when any of the plurality of tag-check-skip conditions are determined not to be satisfied, the tag-check-skip control circuitry is configured to control the memory access circuitry to defer performing a load-operation tag read operation for reading the guard tag from the memory system for use in the given tag check for the tag-checked load operation until after a store-operation guard tag read operation has been performed to read the guard tag for use in the pending tag check for the older tag-checked store operation.

15. The apparatus according to claim 13, in which when any of the plurality of tag-check-skip conditions are determined not to be satisfied, the tag-check-skip control circuitry is configured to control the memory access circuitry to defer return of load data in response to the tag-checked load operation until a result of the given tag check is available for the tag-checked load operation.

16. The apparatus according to claim 13, in which when any of the plurality of tag-check-skip conditions are determined not to be satisfied, the tag-check-skip control circuitry is configured to control the memory access circuitry to allow return of load data in response to the tag-checked load operation before a result of the given tag check is available for the tag-checked load operation.

17. An apparatus comprising:
  means for performing memory access operations to access data stored in a memory system;
  means for tag checking, to perform at least one tag check for a tag-checked memory access operation for accessing data stored at one or more addressed memory system locations identified based on a target address specified by the tag-checked memory access operation, where the target address is associated with an address tag, and each tag check comprises: determining whether the address tag corresponds to a guard tag stored in the memory system associated with at least a subset of the one or more addressed memory system locations, and performing an error reporting action when the tag check identifies that the address tag and the guard tag do not correspond; and
  means for determining whether a plurality of tag-check-skip conditions are satisfied for a tag-checked load operation, the tag-check-skip conditions comprising at least:
    that there is an older tag-checked store operation awaiting a pending tag check, for which a guard tag checked in the pending tag check is associated with the same block of memory system locations as a guard tag to be checked in a given tag check architecturally required to be performed for the tag-checked load operation; and
    that the address tag for the tag-checked load operation is the same as the address tag for the older tag-checked store operation;
  wherein the means for determining is configured to control the means for tag checking to skip performing the given tag check for the tag-checked load operation when the plurality of tag-check-skip conditions are determined to be satisfied.

18. A method comprising:
  performing memory access operations to access data stored in a memory, using an apparatus comprising tag checking circuitry to perform at least one tag check for a tag-checked memory access operation for accessing data stored at one or more addressed memory system locations identified based on a target address specified by the tag-checked memory access operation, where the target address is associated with an address tag, and each tag check comprises: determining whether the address tag corresponds to a guard tag stored in the memory system associated with at least a subset of the one or more addressed memory system locations, and performing an error reporting action when the tag check identifies that the address tag and the guard tag do not correspond;
  for a tag-checked load operation, determining whether a plurality of tag-check-skip conditions are satisfied for a tag-checked load operation, the tag-check-skip conditions comprising at least:
    that there is an older tag-checked store operation awaiting a pending tag check, for which a guard tag checked in the pending tag check is associated with the same block of memory system locations as a guard tag to be checked in a given tag check architecturally required to be performed for the tag-checked load operation; and
    that the address tag for the tag-checked load operation is the same as the address tag for the older tag-checked store operation; and
  when the plurality of tag-check-skip conditions are determined to be satisfied, skipping performing the given tag check for the tag-checked load operation.

* * * * *

UNITED STATES PATENT AND TRADEMARK OFFICE
CERTIFICATE OF CORRECTION

| | |
|---|---|
| PATENT NO. | : 11,221,951 B1 |
| APPLICATION NO. | : 17/028248 |
| DATED | : January 11, 2022 |
| INVENTOR(S) | : Abhishek Raja |

It is certified that error appears in the above-identified patent and that said Letters Patent is hereby corrected as shown below:

On the Title Page

(72) Inventors, "Kias Magnus Bruce" should read --Klas Magnus Bruce--

Signed and Sealed this
Fourteenth Day of June, 2022

Katherine Kelly Vidal
*Director of the United States Patent and Trademark Office*